United States Patent
Sakhnini et al.

(10) Patent No.: US 11,729,605 B2
(45) Date of Patent: Aug. 15, 2023

(54) SUBCARRIER SPACING CAPABILITY

(71) Applicant: QUALCOMM Incorporated, San Diego, CA (US)

(72) Inventors: Iyab Issam Sakhnini, San Diego, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/317,623

(22) Filed: May 11, 2021

(65) Prior Publication Data

US 2022/0369099 A1  Nov. 17, 2022

(51) Int. Cl.
*H04W 8/24* (2009.01)
*H04W 74/08* (2009.01)
*H04W 72/0453* (2023.01)
*H04W 56/00* (2009.01)
*H04W 72/23* (2023.01)

(52) U.S. Cl.
CPC ......... *H04W 8/24* (2013.01); *H04W 56/0015* (2013.01); *H04W 72/0453* (2013.01); *H04W 72/23* (2023.01); *H04W 74/0833* (2013.01)

(58) Field of Classification Search
CPC ............... H04W 8/24; H04W 56/0015; H04W 72/0453; H04W 72/14; H04W 74/0833
See application file for complete search history.

(56) References Cited

U.S. PATENT DOCUMENTS

2020/0366451 A1* 11/2020 Lei ................... H04W 74/006

FOREIGN PATENT DOCUMENTS

| WO | WO-2020198419 A1 * | 10/2020 | ............ H04B 7/063 |
| WO | WO-2021184227 A1 * | 9/2021 | |
| WO | WO-2021191845 A1 * | 9/2021 | |
| WO | WO-2022075900 A1 * | 4/2022 | ........... H04L 5/0048 |
| WO | WO-2022080957 A1 * | 4/2022 | |
| WO | WO-2022115013 A1 * | 6/2022 | |

* cited by examiner

*Primary Examiner* — Saad A. Waqas
(74) *Attorney, Agent, or Firm* — Patterson + Sheridan, LLP

(57) ABSTRACT

Certain aspects of the present disclosure provide techniques for communicating via one or more subcarrier spacings in accordance with an indication of a subcarrier spacing capability. A method that may be performed by a user equipment (UE) includes transmitting, to a network entity, an indication of a subcarrier spacing capability of the UE associated with a frequency range and communicating with the network entity in accordance with the indication.

24 Claims, 10 Drawing Sheets

SUBCARRIER SPACING CAPABILITY

BACKGROUND

Field of the Disclosure

Aspects of the present disclosure relate to wireless communications, and more particularly, to techniques for communicating via one or more subcarrier spacings.

Description of Related Art

Wireless communication systems are widely deployed to provide various telecommunication services such as telephony, video, data, messaging, broadcasts, etc. These wireless communication systems may employ multiple-access technologies capable of supporting communication with multiple users by sharing available system resources (e.g., bandwidth, transmit power, etc.). Examples of such multiple-access systems include 3rd Generation Partnership Project (3GPP) Long Term Evolution (LTE) systems, LTE Advanced (LTE-A) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems, to name a few.

These multiple access technologies have been adopted in various telecommunication standards to provide a common protocol that enables different wireless devices to communicate on a municipal, national, regional, and even global level. New radio (e.g., 5G NR) is an example of an emerging telecommunication standard. NR is a set of enhancements to the LTE mobile standard promulgated by 3GPP. NR is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL). To these ends, NR supports beamforming, multiple-input multiple-output (MIMO) antenna technology, and carrier aggregation.

However, as the demand for mobile broadband access continues to increase, there exists a need for further improvements in NR and LTE technology. These improvements should be applicable to other multi-access technologies and the telecommunication standards that employ these technologies.

SUMMARY

The systems, methods, and devices of the disclosure each have several aspects, no single one of which is solely responsible for its desirable attributes. After considering this discussion, and particularly after reading the section entitled "Detailed Description" one will understand how the features of this disclosure provide one or more manners for indicating a subcarrier spacing capability, which may enable desirable latencies and/or data rates.

Certain aspects of the subject matter described in this disclosure can be implemented in a method for wireless communication by a user equipment (UE). The method generally includes transmitting, to a network entity, an indication of a subcarrier spacing capability of the UE associated with a frequency range and communicating with the network entity in accordance with the indication.

Certain aspects of the subject matter described in this disclosure can be implemented in a method for wireless communication by a network entity. The method generally includes receiving, from a UE, an indication of a subcarrier spacing capability of the UE associated with a frequency range and communicating with the UE in accordance with the indication.

Certain aspects of the subject matter described in this disclosure can be implemented in an apparatus for wireless communication. The apparatus generally includes a transceiver configured to transmit, to a network entity, an indication of a subcarrier spacing capability of the apparatus associated with a frequency range and communicate with the network entity in accordance with the indication.

Certain aspects of the subject matter described in this disclosure can be implemented in an apparatus for wireless communication. The apparatus generally includes a transceiver configured to receive, from a UE, an indication of a subcarrier spacing capability of the UE associated with a frequency range and communicate with the UE in accordance with the indication.

Certain aspects of the subject matter described in this disclosure can be implemented in an apparatus for wireless communication. The apparatus generally includes means for transmitting, to a network entity, an indication of a subcarrier spacing capability of the apparatus associated with a frequency range; and means for communicating with the network entity in accordance with the indication.

Certain aspects of the subject matter described in this disclosure can be implemented in an apparatus for wireless communication. The apparatus generally includes means for receiving, from a UE, an indication of a subcarrier spacing capability of the UE associated with a frequency range; and means for communicating with the UE in accordance with the indication.

Certain aspects of the subject matter described in this disclosure can be implemented in a user equipment for wireless communication. The user equipment generally includes a memory and a processor. The processing is coupled to the memory, and the processor and the memory are configured to transmit, to a network entity, an indication of a subcarrier spacing capability of the user equipment associated with a frequency range and communicate with the network entity in accordance with the indication.

Certain aspects of the subject matter described in this disclosure can be implemented in a network entity for wireless communication. The network entity generally includes a memory and a processor. The processor is coupled to the memory, and the processor and the memory are configured to receive, from a UE, an indication of a subcarrier spacing capability of the UE associated with a frequency range and communicate with the UE in accordance with the indication.

Certain aspects of the subject matter described in this disclosure can be implemented in a computer-readable medium. The computer-readable medium has instructions stored thereon for transmitting, to a network entity, an indication of a subcarrier spacing capability associated with a frequency range; and communicating with the network entity in accordance with the indication.

Certain aspects of the subject matter described in this disclosure can be implemented in a computer-readable medium. The computer-readable medium has instructions stored thereon for receiving, from a UE, an indication of a subcarrier spacing capability of the UE associated with a frequency range; and communicating with the UE in accordance with the indication.

To the accomplishment of the foregoing and related ends, the one or more aspects comprise the features hereinafter fully described and particularly pointed out in the claims. The following description and the appended drawings set forth in detail certain illustrative features of the one or more aspects. These features are indicative, however, of but a few of the various ways in which the principles of various aspects may be employed.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the drawings. It is to be noted, however, that the appended drawings illustrate only certain aspects of this disclosure and the description may admit to other equally effective aspects.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
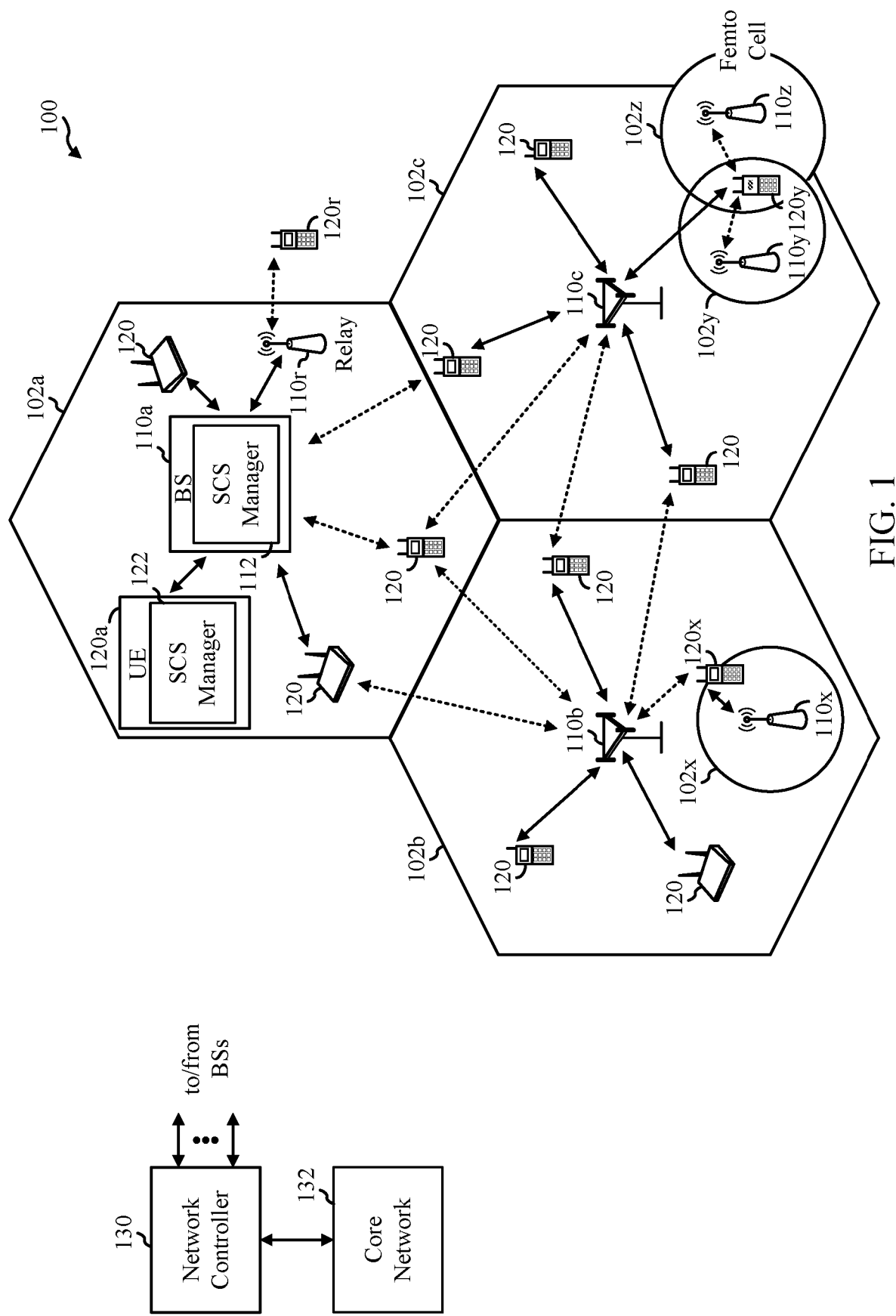
FIG. 1 is a block diagram conceptually illustrating an example wireless communication network, in accordance with certain aspects of the present disclosure.

Aspects of the present disclosure provide apparatus, methods, processing systems, and computer readable mediums for indicating a subcarrier spacing (SCS) capability of a user equipment (UE), for example, for the SCS(s) of 480 KHz and/or 960 KHz in the 52.6 GHz to 71 GHz frequency bands. As an example, the UE may indicate the SCS capability in a random access channel (RACH) procedure to facilitate early indication of the UE's support for optional SCS(s) at the network. In certain cases, the UE may indicate the SCS capability in data and/or control transmission(s). The UE may provide the indication to the network without being prompted by the network (e.g., via a UE capability enquiry message in radio resource control (RRC) signaling). Such a unilateral indication by the UE may provide desirable latencies in communicating via the optional SCSs in the 52.6 GHz to 71 GHz frequency bands. For example, the UE may unilaterally indicate the SCS capability using an SCS different from 480 KHz and/or 960 KHz, and the network may switch to using one of the supported SCSs (e.g., 480 KHz and/or 960 KHz) to communicate with the UE. Based on the indication, the network may communicate with the UE using at least one of the indicated SCSs, which may enable desirable wireless communication performance, such as desirable latencies and/or data rates.

The following description provides examples of wireless communication in communication systems. Changes may be made in the function and arrangement of elements discussed without departing from the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the disclosure is intended to cover such an apparatus or method which is practiced using other structure, functionality, or structure and functionality in addition to, or other than, the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a subcarrier, a frequency channel, a tone, a subband, etc. Each frequency may support a single RAT in a given geographic area in order to avoid interference between wireless networks of different RATs.

The techniques described herein may be used for various wireless networks and radio technologies. While aspects may be described herein using terminology commonly associated with 3G, 4G, and/or new radio (e.g., 5G NR) wireless technologies, aspects of the present disclosure can be applied in other generation-based communication systems.

NR access may support various wireless communication services, such as enhanced mobile broadband (eMBB) targeting wide bandwidth, millimeter wave mmW, massive machine type communications MTC (mMTC) targeting non-backward compatible MTC techniques, and/or mission critical targeting ultra-reliable low-latency communications (URLLC). These services may include latency and reliability requirements. These services may also have different transmission time intervals (TTI) to meet respective quality of service (QoS) requirements. In addition, these services may co-exist in the same subframe.

The electromagnetic spectrum is often subdivided, based on frequency/wavelength, into various classes, bands, channels, etc. In 5G NR two initial operating bands have been identified as frequency range designations FR1 (410 MHz-7.125 GHz) and FR2 (24.25 GHz-52.6 GHz and/or 52.6 GHz-71 GHz). The frequencies between FR1 and FR2 are often referred to as mid-band frequencies. Although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, or may be within the EHF band.

NR supports beamforming and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells.

FIG. 1 illustrates an example wireless communication network 100 in which aspects of the present disclosure may be performed. For example, the wireless communication network 100 may be an NR system (e.g., a 5G NR network). As shown in FIG. 1, the wireless communication network 100 may be in communication with a core network 132. The core network 132 may in communication with one or more base station (BSs) 110*a-z* (each also individually referred to herein as BS 110 or collectively as BSs 110) and/or user equipment (UE) 120*a-y* (each also individually referred to herein as UE 120 or collectively as UEs 120) in the wireless communication network 100 via one or more interfaces.

As shown in FIG. 1, the BS 110*a* includes an SCS manager 112 that receives an indication of an SCS capability of a UE and communicates with that UE based on the indication, in accordance with aspects of the present disclosure. The UE 120*a* includes an SCS manager 122 that transmits an indication of the UE's SCS capability and communicates with a BS based on the indication, in accordance with aspects of the present disclosure.

A BS 110 may provide communication coverage for a particular geographic area, sometimes referred to as a "cell", which may be stationary or may move according to the location of a mobile BS 110. In some examples, the BSs 110 may be interconnected to one another and/or to one or more other BSs or network nodes (not shown) in wireless communication network 100 through various types of backhaul interfaces (e.g., a direct physical connection, a wireless connection, a virtual network, or the like) using any suitable transport network. In the example shown in FIG. 1, the BSs 110*a*, 110*b* and 110*c* may be macro BSs for the macro cells 102*a*, 102*b* and 102*c*, respectively. The BS 110*x* may be a pico BS for a pico cell 102*x*. The BSs 110*y* and 110*z* may be femto BSs for the femto cells 102*y* and 102*z*, respectively. A BS may support one or multiple cells.

The BSs 110 communicate with UEs 120 in the wireless communication network 100. The UEs 120 (e.g., 120*x*, 120*y*, etc.) may be dispersed throughout the wireless communication network 100, and each UE 120 may be stationary or mobile. Wireless communication network 100 may also include relay stations (e.g., relay station 110*r*), also referred to as relays or the like, that receive a transmission of data and/or other information from an upstream station (e.g., a BS 110*a* or a UE 120*r*) and sends a transmission of the data and/or other information to a downstream station (e.g., a UE 120 or a BS 110), or that relays transmissions between UEs 120, to facilitate communication between devices.

A network controller 130 may be in communication with a set of BSs 110 and provide coordination and control for these BSs 110 (e.g., via a backhaul). In certain cases, the network controller 130 may include a centralized unit (CU) and/or a distributed unit (DU), for example, in a 5G NR system. In aspects, the network controller 130 may be in communication with a core network 132 (e.g., a 5G Core Network (5GC)), which provides various network functions such as Access and Mobility Management, Session Management, User Plane Function, Policy Control Function, Authentication Server Function, Unified Data Management, Application Function, Network Exposure Function, Network Repository Function, Network Slice Selection Function, etc.

Figure 2:
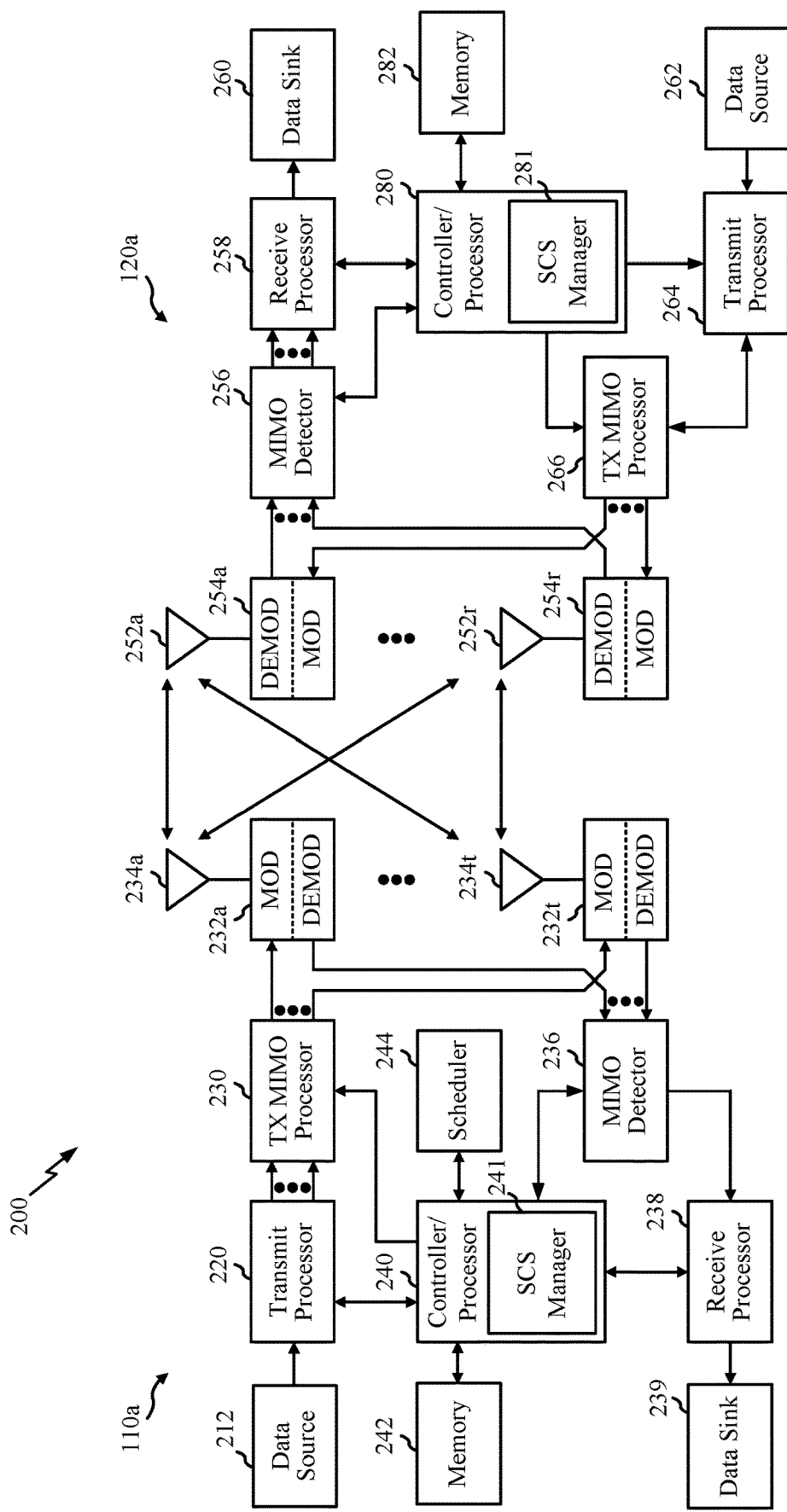
FIG. 2 is a block diagram conceptually illustrating a design of an example a base station (BS) and user equipment (UE), in accordance with certain aspects of the present disclosure.

FIG. 2 illustrates example components of BS 110*a* and UE 120*a* (e.g., the wireless communication network 100 of FIG. 1), which may be used to implement aspects of the present disclosure.

At the BS 110*a*, a transmit processor 220 may receive data from a data source 212 and control information from a controller/processor 240. The control information may be for the physical broadcast channel (PBCH), physical control format indicator channel (PCFICH), physical hybrid ARQ indicator channel (PHICH), physical downlink control channel (PDCCH), group common PDCCH (GC PDCCH), etc. The data may be for the physical downlink shared channel (PDSCH), etc. A medium access control (MAC)-control element (MAC-CE) is a MAC layer communication structure that may be used for control command exchange between wireless nodes. The MAC-CE may be carried in a shared channel such as a physical downlink shared channel (PDSCH), a physical uplink shared channel (PUSCH), or a physical sidelink shared channel (PSSCH).

The processor 220 may process (e.g., encode and symbol map) the data and control information to obtain data symbols and control symbols, respectively. The transmit processor 220 may also generate reference symbols, such as for the primary synchronization signal (PSS), secondary synchronization signal (SSS), PBCH demodulation reference signal (DMRS), and channel state information reference signal (CSI-RS). A transmit (TX) multiple-input multiple-output (MIMO) processor 230 may perform spatial processing (e.g., precoding) on the data symbols, the control symbols, and/or the reference symbols, if applicable, and may provide output symbol streams to the modulators (MODs) in transceivers 232a-232t. Each modulator in transceivers 232a-232t may process a respective output symbol stream (e.g., for OFDM, etc.) to obtain an output sample stream. Each modulator may further process (e.g., convert to analog, amplify, filter, and upconvert) the output sample stream to obtain a downlink signal. Downlink signals from the modulators in transceivers 232a-232t may be transmitted via the antennas 234a-234t, respectively.

At the UE 120a, the antennas 252a-252r may receive the downlink signals from the BS 110a and may provide received signals to the demodulators (DEMODs) in transceivers 254a-254r, respectively. Each demodulator in transceivers 254a-254r may condition (e.g., filter, amplify, downconvert, and digitize) a respective received signal to obtain input samples. Each demodulator may further process the input samples (e.g., for OFDM, etc.) to obtain received symbols. A MIMO detector 256 may obtain received symbols from all the demodulators in transceivers 254a-254r, perform MIMO detection on the received symbols if applicable, and provide detected symbols. A receive processor 258 may process (e.g., demodulate, deinterleave, and decode) the detected symbols, provide decoded data for the UE 120a to a data sink 260, and provide decoded control information to a controller/processor 280.

On the uplink, at UE 120a, a transmit processor 264 may receive and process data (e.g., for the physical uplink shared channel (PUSCH)) from a data source 262 and control information (e.g., for the physical uplink control channel (PUCCH) from the controller/processor 280. The transmit processor 264 may also generate reference symbols for a reference signal (e.g., for the sounding reference signal (SRS)). The symbols from the transmit processor 264 may be precoded by a TX MIMO processor 266 if applicable, further processed by the modulators in transceivers 254a-254r (e.g., for SC-FDM, etc.), and transmitted to the BS 110a. At the BS 110a, the uplink signals from the UE 120a may be received by the antennas 234, processed by the demodulators in transceivers 232a-232t, detected by a MIMO detector 236 if applicable, and further processed by a receive processor 238 to obtain decoded data and control information sent by the UE 120a. The receive processor 238 may provide the decoded data to a data sink 239 and the decoded control information to the controller/processor 240.

The memories 242 and 282 may store data and program codes for BS 110a and UE 120a, respectively. A scheduler 244 may schedule UEs for data transmission on the downlink and/or uplink.

Antennas 252, processors 266, 258, 264, and/or controller/processor 280 of the UE 120a and/or antennas 234, processors 220, 230, 238, and/or controller/processor 240 of the BS 110a may be used to perform the various techniques and methods described herein. For example, as shown in FIG. 2, the controller/processor 240 of the BS 110a has an SCS manager 241 that may be representative of the SCS manager 112, according to aspects described herein. As shown in FIG. 2, the controller/processor 280 of the UE 120a has an SCS manager 281 that may be representative of the SCS manager 122, according to aspects described herein. Although shown at the controller/processor, other components of the UE 120a and BS 110a may be used to perform the operations described herein.

While the UE 120a is described with respect to FIGS. 1 and 2 as communicating with a BS and/or within a network, the UE 120a may be configured to communicate directly with/transmit directly to another UE 120, or with/to another wireless device without relaying communications through a network. In some embodiments, the BS 110a illustrated in FIG. 2 and described above is an example of another UE 120.

NR may utilize orthogonal frequency division multiplexing (OFDM) with a cyclic prefix (CP) on the uplink and downlink. NR may support half-duplex operation using time division duplexing (TDD). OFDM and single-carrier frequency division multiplexing (SC-FDM) partition the system bandwidth into multiple orthogonal subcarriers, which are also commonly referred to as tones, bins, etc. Each subcarrier may be modulated with data. Modulation symbols may be sent in the frequency domain with OFDM and in the time domain with SC-FDM. The spacing between adjacent subcarriers may be fixed, and the total number of subcarriers may be dependent on the system bandwidth. The minimum resource allocation, called a resource block (RB), may be 12 consecutive subcarriers. The system bandwidth may also be partitioned into subbands. For example, a subband may cover multiple RBs. NR may support a base subcarrier spacing (SCS) of 15 KHz and other SCS may be defined with respect to the base SCS (e.g., 30 kHz, 60 kHz, 120 kHz, 240 kHz, etc.).

Figure 3:
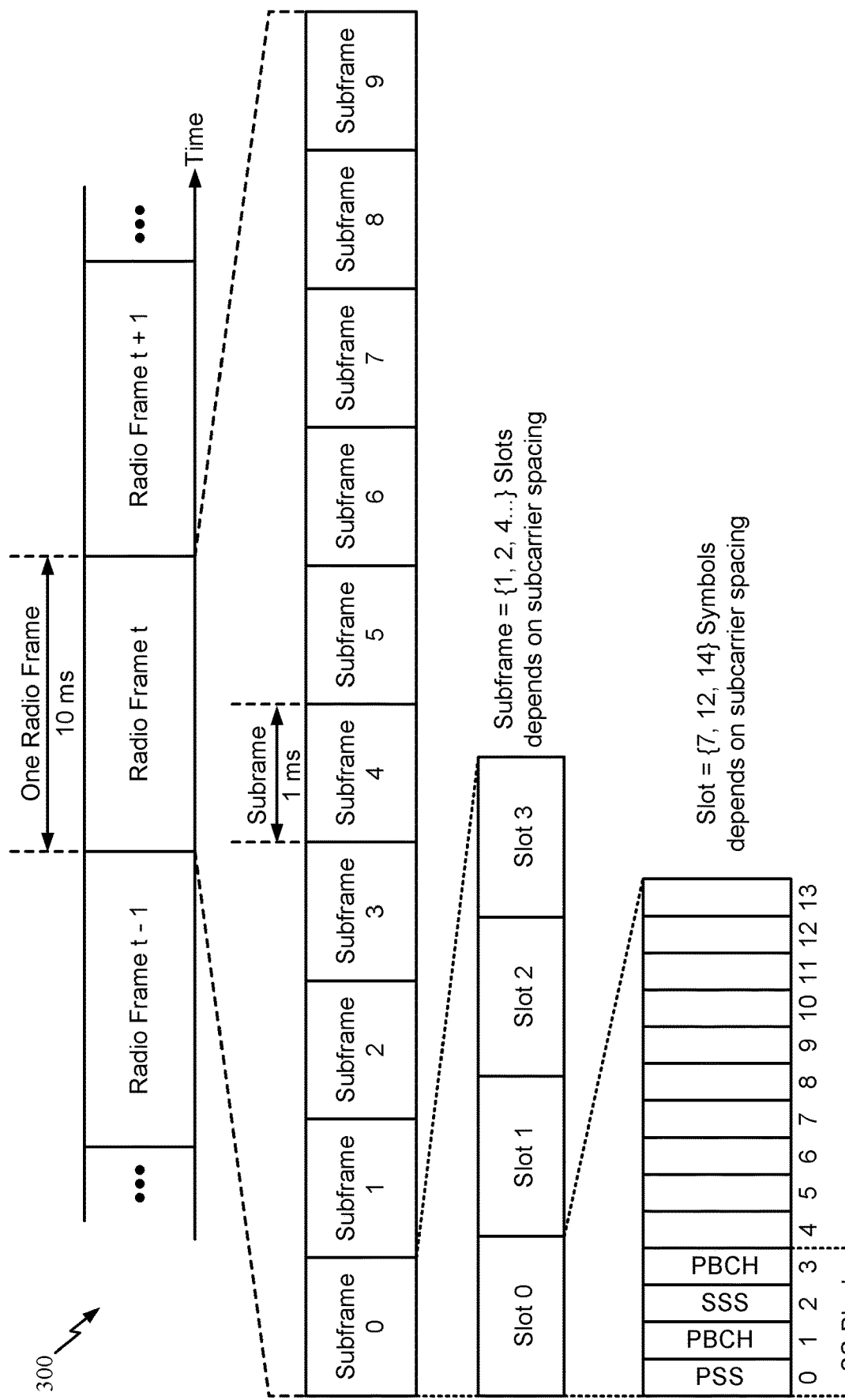
FIG. 3 is an example frame format for certain wireless communication systems (e.g., new radio (NR)), in accordance with certain aspects of the present disclosure.

FIG. 3 is a diagram showing an example of a frame format 300 for NR. The transmission timeline for each of the downlink and uplink may be partitioned into units of radio frames. Each radio frame may have a predetermined duration (e.g., 10 ms) and may be partitioned into 10 subframes, each of 1 ms, with indices of 0 through 9. Each subframe may include a variable number of slots (e.g., 1, 2, 4, 8, 16, . . . slots) depending on the SCS. Each slot may include a variable number of symbol periods (e.g., 7, 12, or 14 symbols) depending on the SCS. The symbol periods in each slot may be assigned indices. A sub-slot structure may refer to a transmit time interval having a duration less than a slot (e.g., 2, 3, or 4 symbols). Each symbol in a slot may be configured for a link direction (e.g., downlink (DL), uplink (UL), or flexible) for data transmission and the link direction for each subframe may be dynamically switched. The link directions may be based on the slot format. Each slot may include DL/UL data as well as DL/UL control information.

In NR, a synchronization signal block (SSB) is transmitted. In certain aspects, SSBs may be transmitted in a burst where each SSB in the burst corresponds to a different beam direction for UE-side beam management (e.g., including beam selection and/or beam refinement). The SSB includes a PSS, a SSS, and a two symbol PBCH. The SSB can be transmitted in a fixed slot location, such as the symbols 0-3 as shown in FIG. 3. The PSS and SSS may be used by UEs for cell search and acquisition. The PSS may provide half-frame timing, the SS may provide the CP length and frame timing. The PSS and SSS may provide the cell identity. The PBCH carries some basic system information, such as downlink system bandwidth, timing information within radio frame, SS burst periodicity, system frame number, etc. The SSBs may be organized into an SS burst to support beam sweeping. Further system information such as, remaining minimum system information (RMSI), system information blocks (SIBs), other system information (OSI) can be transmitted on a physical downlink shared channel (PDSCH) in certain subframes. The SSB can be transmitted up to sixty-four times within an SS burst, for example, with up to sixty-four different beam directions for mmWave. The multiple transmissions of the SSB are referred to as an SS burst in a half radio frame. SSBs in an SS burst may be transmitted in the same frequency region, while SSBs in different SS bursts can be transmitted at different frequency regions.

Figure 4:
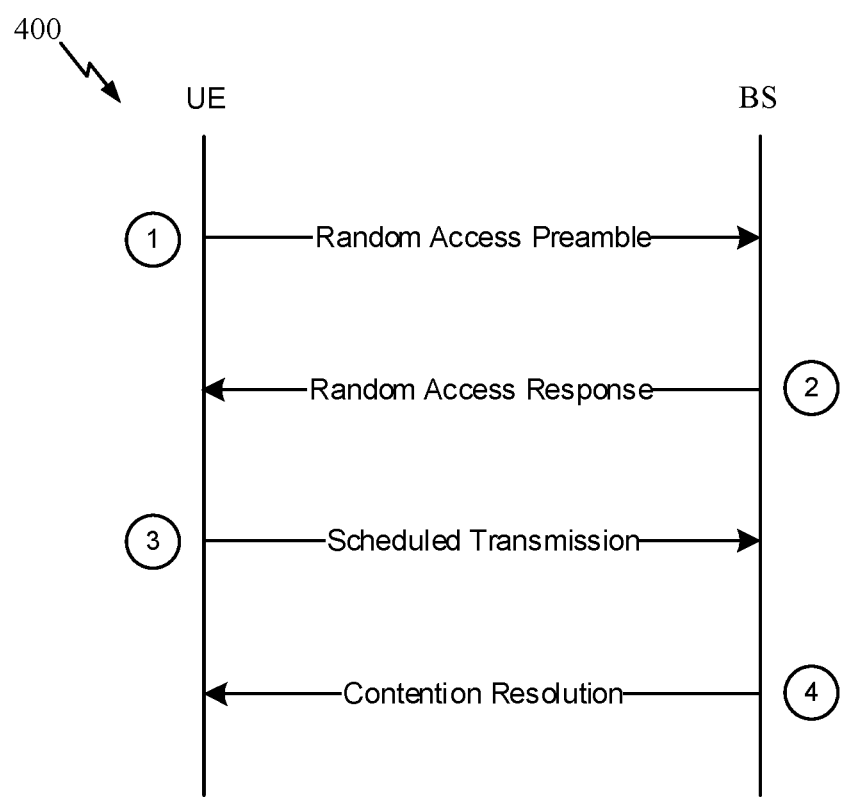
FIG. 4 is a signaling flow diagram illustrating an example four-step random access channel (RACH) procedure, in accordance with certain aspects of the present disclosure.

In various scenarios, a UE may communicate with a network entity (such as a base station) via a random access channel (RACH) procedure. For example, the UE may use a RACH procedure for initial radio resource control (RRC) connection setup, RRC connection re-establishment, a handover scenario, a scheduling request failure, beam recovery, downlink or uplink data arrival, etc. FIG. 4 illustrates an example four-step RACH procedure 400, in accordance with certain aspects of the present disclosure. In a first message (MSG1), the UE transmits a random access (RA) preamble to the BS. The UE may monitor for a response from the BS within a configured time window. The UE may receive the random access response (RAR) from the BS, where the RAR may include uplink scheduling for the UE. Upon reception of the RAR, the UE sends a third message (MSG3) using the uplink grant scheduled in the response and monitors for contention resolution. The UE may receive a contention resolution message (MSG4) indicating whether the BS was able to successfully decode MSG3. If contention resolution is not successful after the MSG3 transmission and/or retransmission(s) of MSG3, the UE may go back to MSG1 transmission. If contention resolution is successful, the UE may transmit an acknowledgement message (MSG5) to the BS (not shown).

Figure 5A:
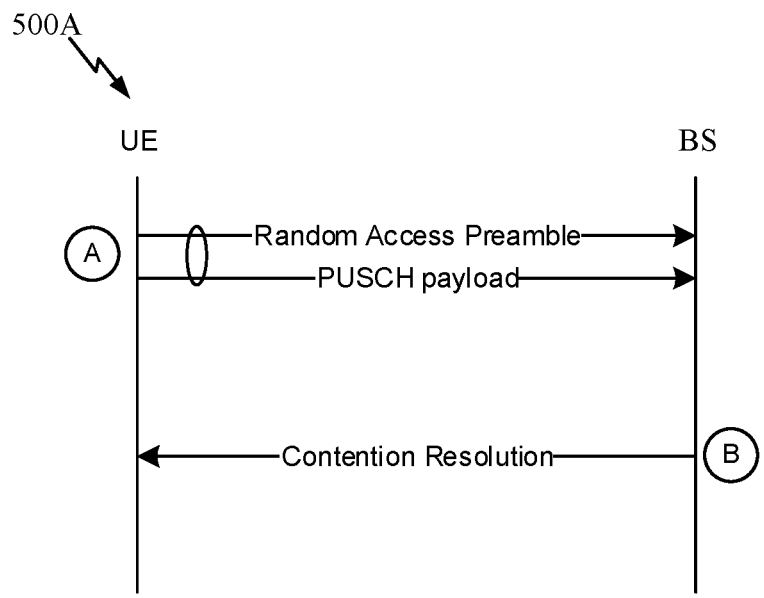
FIG. 5A is a signaling flow diagram illustrating an example of a two-step RACH procedure, where contention resolution is successful at the BS, in accordance with certain aspects of the present disclosure.

FIG. 5A illustrates an example of a two-step RACH procedure 500A, where contention resolution is successful at the BS, in accordance with certain aspects of the present disclosure. The UE may transmit in a first message (MSGA) including a preamble on a physical random access channel (PRACH) and a payload on a PUSCH. After the MSGA transmission, the UE monitors for a response from the BS within a configured time window. If contention resolution is successful upon receiving the network response (MSGB), the UE ends the random access procedure, and in certain cases, the UE may communicate with the BS in a connected state.

Figure 5B:
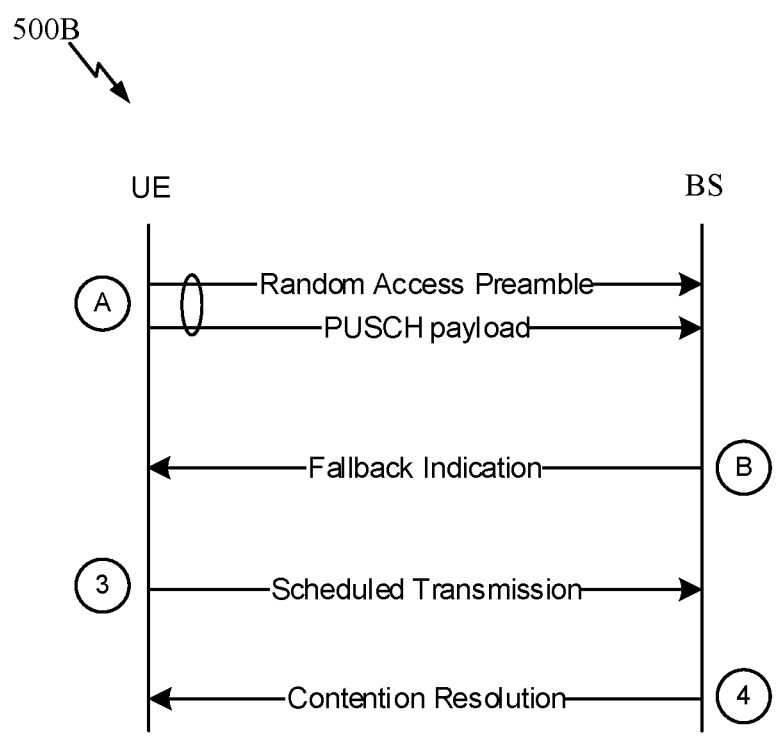
FIG. 5B is a signaling flow diagram illustrating an example of a two-step RACH procedure, where contention resolution is unsuccessful at the BS, in accordance with certain aspects of the present disclosure.

FIG. 5B illustrates an example of a two-step RACH procedure 500B, where contention resolution is unsuccessful at the BS, in accordance with certain aspects of the present disclosure. In this example, if a fallback indication is received in MSGB, the UE may perform MSG3 transmission using the UL grant scheduled in the fallback indication and monitors contention resolution. If contention resolution is not successful after MSG3 transmission and/or retransmission(s), the UE may go back to the MSGA transmission. FIGS. 4, 5A and 5B illustrate examples of contention-based random access (CBRA) procedures to facilitate understanding. Aspects of the present disclosure may also apply to contention-free random access (CFRA) procedures, where the network may initially provide a RA preamble and/or uplink resource assignment to the UE.

In NR systems, frequency bands higher than FR2 may be supported, such as frequency bands in 52.6 GHz to 71 GHz. Such high frequency bands may use higher SCSs, such as an SCS of 480 KHz and/or 960 KHz. These high SCS may enable desirable latencies and/or data rates. For example, the duration of a slot may be about 31 µs at 480 KHz and about 15 µs at 960 KHz. In the 52.6 GHz to 71 GHz frequency bands, the network may support up to 64 different SSB beams at SCSs of 120 kHz, 240 kHz, 480 kHz, and/or 960 kHz for initial access related signals and other signals associated with the SSB beams. Support for 480 KHz SCS and/or 960 KHz SCS may be optional in the 52.6 GHz to 71 GHz frequency bands. Accordingly, what is needed are techniques and apparatus for indicating whether a UE supports the 480 KHz SCS and/or 960 KHz SCS in 52.6 GHz to 71 GHz frequency bands.

Example Subcarrier Spacing Capability for mmWave Bands

Aspects of the present disclosure provide techniques and apparatus for indicating SCS capability of a UE, for example, for the SCS(s) of 480 KHz and/or 960 KHz in the 52.6 GHz to 71 GHz frequency bands. As an example, the UE may indicate the SCS capability in a RACH procedure to facilitate early indication of the UE's support for the optional SCS(s) at the network. In certain cases, the UE may indicate the SCS capability in PUSCH and/or PUCCH transmission(s), such as MSG5 and/or in subsequent transmission following a RACH procedure. The UE may provide the indication to the network without being prompted by the network (e.g., via a UE capability enquiry message in radio resource control (RRC) signaling). Such a unilateral indication by the UE may provide desirable latencies in communicating via the optional SCSs in the 52.6 GHz to 71 GHz frequency bands. For example, the UE may unilaterally indicate the SCS capability using an SCS different from 480 KHz and/or 960 KHz, and the network may switch to using one of the supported SCSs (e.g., 480 KHz and/or 960 KHz) to communicate with the UE. Based on the indication, the network may communicate with the UE using at least one of the indicated SCSs, which may enable desirable wireless communication performance, such as desirable latencies and/or data rates.

Figure 6:
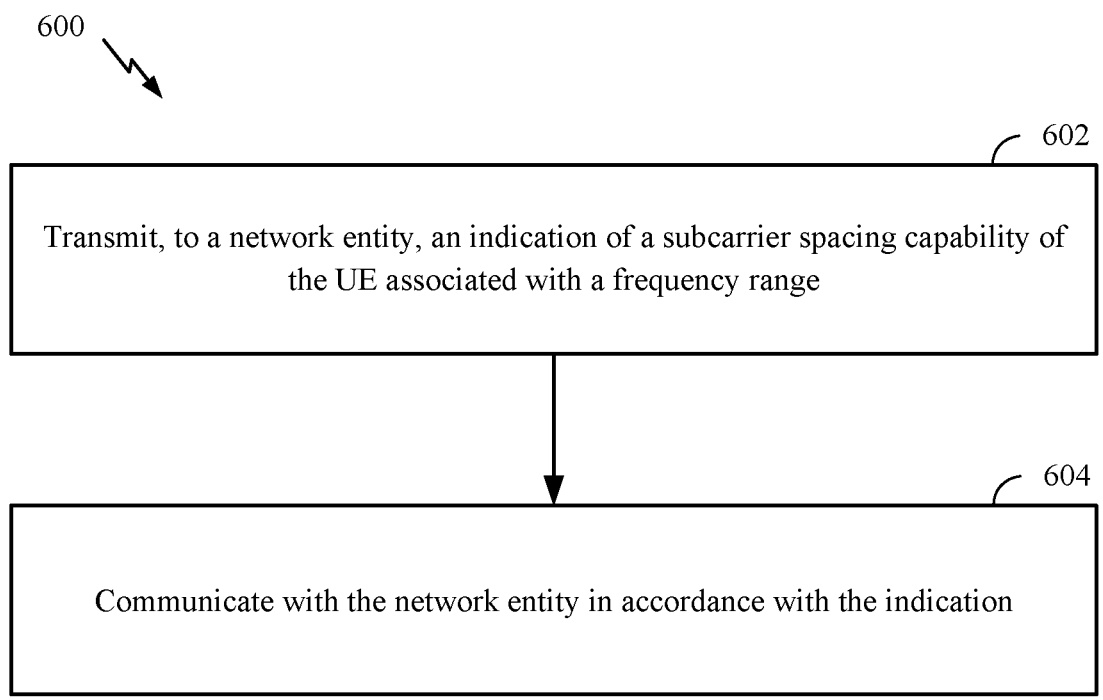
FIG. 6 is a flow diagram illustrating example operations for wireless communication by a UE, in accordance with certain aspects of the present disclosure.

FIG. 6 is a flow diagram illustrating example operations 600 for wireless communication, in accordance with certain aspects of the present disclosure. The operations 600 may be performed, for example, by a UE (such as the UE 120a in the wireless communication network 100). The operations 600 may be implemented as software components that are executed and run on one or more processors (e.g., controller/processor 280 of FIG. 2). Further, the transmission and reception of signals by the UE in operations 600 may be enabled, for example, by one or more antennas (e.g., antennas 252 of FIG. 2) and/or a transceiver (e.g., the transceiver 254). In certain aspects, the transmission and/or reception of signals by the UE may be implemented via a bus interface of one or more processors (e.g., controller/processor 280) obtaining and/or outputting signals.

The operations 600 may begin, at block 602, where the UE may transmit, to a network entity (e.g., the BS 110), an indication of a subcarrier spacing (SCS) capability of the UE associated with a frequency range. For example, the UE may send the indication of the SCS capability in a RACH procedure, a PUSCH transmission, and/or a PUCCH transmission. In certain cases, the UE may send the indication to the network entity without being prompted by the network entity to provide capability information. As described herein, such a unilateral approach to providing the SCS capability of the UE may enable the network to detect the SCS capabilities of the UE and provide low latency services to the UE, for example, using at least one of the optional SCSs of 480 KHz and 960 KHz. In aspects, the frequency range may include mmWave frequency bands such as 52.6 GHz to 71 GHz. The SCS capability may provide that the UE supports one or more SCSs including at least one of 480 kHz or 960 kHz. In certain aspects, the SCS capability may be exclusively for optional SCSs, such as 480 kHz and/or 960 kHz. That is, the SCS capability may indicate which SCS(s) are supported by the UE among the optional SCSs. In certain cases, the SCS capability may indicate whether a particular is supported for downlink and/or uplink transmissions.

At block 604, the UE may communicate with the network entity in accordance with the indication. For example, the SCS capability may indicate that the UE supports the SCS of 480 kHz, and in response to the indication, the UE may receive a downlink transmission from the network entity at the SCS of 480 kHz. At block 604, communicating with the network entity may include reception of downlink signals from the network entity and/or transmission of uplink signals to the network entity at the UE.

In aspects, the UE may indicate to the network entity its capability of SCSs (e.g., 480 kHz and/or 960 kHz) in various manners. For example, the indication may be provided via at least one of a frequency domain resource or a time domain resource used to transmit the indication. That is, specific frequency resource and/or time resource may be associated with the SCS capability, and if the UE transmits a message using the frequency resource and/or time resource, the usage of such frequency resource and/or time resource may indicate the SCS capability to the network.

In certain cases, the indication may be provided via the SCS used to transmit the indication. In other words, a specific SCS may be associated with the SCS capability, and if the UE transmits a message using the SCS, the usage of that SCS may indicate the SCS capability to the network. For example, if the UE transmits a RA preamble using the SCS of 480 kHz, the usage of the SCS of 480 kHz may indicate the UE's support for SCS 480 kHz.

In certain cases, the indication may be provided by a reference signal (such as a DMRS and/or SRS) transmitted by the UE. For example, certain aspects associated with the reference signal may indicate the SCS capability, such as a specific cyclic shift, root index, and/or initialization value used to generate a sequence for the reference signal.

In certain aspects, the UE may indicate the SCS capability in a RACH procedure (e.g., any of the RACH procedures depicted in FIG. 4, 5A, or 5B). For example, the RACH preamble sequence (in MSG1 and/or MSGA) may indicate the SCS capability explicitly (e.g., through a control field indicating a particular SCS capability) or implicitly (e.g., through an association between an aspect of the preamble and an SCS capability). With respect to the operations 600, the UE may transmit the indication via a RACH preamble sequence at block 602. In aspects, specific root(s) and/or cyclic shift(s) used to generate the preamble sequence may indicate the SCS capability. That is, the indication at block 602 may be provided via at least one of a root value or a cyclic shift used to generate the RACH preamble sequence. A specific RACH Occasion (RO) (such as a specific location in frequency and/or time of the preamble) may indicate the SCS capability. That is, the indication at block 602 may be provided via at least one of a frequency domain resource or a time domain resource used to transmit the RACH preamble sequence. In other words, the network may have separate frequency and/or time resources for RACH messages (such as the preamble) associated with the SCS capability. The SCS used to transmit the preamble may indicate the SCS capability. That is, the indication at block 602 may be provided via the SCS used to transmit the RACH preamble sequence.

In certain cases, the payload (e.g., MSG3 and/or MSGA) sent in the PUSCH in a RACH procedure may indicate the SCS capability explicitly or implicitly. With respect to the operations 600, the UE may transmit the indication via a payload on a PUSCH in a RACH procedure at block 602. A specific initialization(s) and/or cyclic shift(s) used to generate the DMRS sequence sent with the payload may indicate the SCS capability. That is, the payload may be transmitted with a DMRS, and the indication at block 602 may be provided via at least one of an initialization value or a cyclic shift used to generate a sequence for the DMRS. In certain cases, the network may provide the UE with different resources corresponding to different SCS capabilities in the PUSCH grant to indicate the SCS capability. In other words, the indication at block 602 may be provided via at least one of a frequency domain resource or a time domain resource used to transmit the payload. The SCS used to transmit the payload may indicate the SCS capability. In other words, the indication at block 602 may be provided via the SCS used to transmit the payload.

The various manners for indicating the SCS capability may be applied in the context of a two-step RACH procedure and/or a four-step RACH procedure. For example, a combination of the aspects described herein for the preamble and/or payload may be applied to MSG1, MSG3, and/or MSGA for the corresponding RACH procedure (four-step or two-step). With respect to the operations 600, the UE may transmit the indication via a message (e.g., MSGA) including a RACH preamble sequence on a PRACH and a payload on PUSCH. The indication at block 602 may be provided via at least one of a root value, an initialization value, or a cyclic shift used to generate at least one of the RACH preamble sequence or a sequence for a DMRS associated with the payload. The indication at block 602 may be provided via at least one of a frequency domain resource or a time domain resource used to transmit at least one of the RACH preamble sequence or the payload. The indication at block 602 may be provided via the SCS(s) used to transmit at least one of the RACH preamble sequence or the payload.

The various manners for indicating the SCS capability via the payload on the PUSCH may be applied in the context of a PUCCH transmission and/or PUSCH transmission. For example, the DMRS and/or SRS for a PUCCH transmission and/or PUSCH transmission may provide the SCS capability. The frequency resource and/or time resource used transmit a PUCCH transmission and/or PUSCH transmission may indicate the SCS capability. The SCS used to transmit a PUCCH transmission and/or PUSCH transmission may indicate the SCS capability. In certain cases, the PUCCH transmission and/or PUSCH transmission carrying the indication may follow a RACH procedure. That is, the UE may transmit the indication at block 602 via message following a RACH procedure.

In certain cases, the SCS capability may be indicated via MSG5, for example, as described herein with respect to FIG. 4, explicitly or implicitly. That is, in response to MSG4, the UE may send a feedback message (e.g., an acknowledgement message), and that feedback message may provide the indication explicitly or implicitly. With respect to the operations 602, the UE may receive a contention resolution message (e.g., MSG4 and/or MSGB) from the network entity in a RACH procedure, and the UE may transmit a feedback message in response to the contention resolution message, where the indication at block 602 may be provided via the feedback message. In aspects, a PUCCH sequence (e.g., a DMRS sequence) may provide the SCS capability. The DMRS and/or SRS for the feedback message may provide the SCS capability. The resource(s) and/or SCS used to transmit the PUCCH may indicate the SCS capability.

For certain aspects, the network may have separate SSB(s) using the optional SCS(s), and the UE(s) capable of acquiring the SSBs may communicate in RACH occasions associated with the SSB(s) using the optional SCS(s). The UE may acquire synchronization of cell's timing and/or frequency via an SSB at a particular SCS (e.g., 480 kHz and/or 960 kHz) within the capabilities of the UE, and the UE may transmit the indication via the SCS associated with the SSB. For example, the network may have separate SSBs using 120 kHz and 960 kHz SCSs, and the UE may acquire the 960 kHz SSB and send a RACH preamble in a RACH occasion associated with the SSB using the 960 kHz SCS. With respect to the operations 600, the UE may receive, from the network entity, a synchronization signal (e.g., an SSB) using at least one of the SCSs (e.g., 480 kHz and/or 960 kHz) supported by the UE, and at block 602, the UE may transmit the indication via the SCSs associated with the synchronization signal.

In certain aspects, based on a pre-configuration or a configuration received from the network, the messages after the SCS capability indication at block 602 may or may not use the SCS indicated by the UE capability, assuming the SCS capability is sent on a separate SCS from the SCS(s) indicated in the SCS capability. In certain cases, the UE may automatically switch to at least one of the options SCS after sending the SCS capability. In certain cases, the switch to the optional SCSs may depend on a configuration received from the network. For example, suppose a UE indicates that it supports an SCS of 960 kHz in MSG1 and/or MSGA of a RACH procedure using SCS 120 kHz, subsequent messages (e.g., MSG2, MSG3, and MSG4) in the RACH procedure may use the 960 kHz SCS, for example, with or without direction from the network to switch. In certain cases, the SCS change may also mean a switch in bandwidth part to a mmWave band, which may use a tuning gap in time to enable the UE to retune to the mmWave band. That is, to execute the SCS change at the UE, the UE may also switch to a frequency band that supports the SCS(s) indicated at block 602, such as the mmWave bands in 52.6 GHz to 71 GHz.

At block 604, the UE may communicate with the network entity via at least one of the SCSs indicated at block 602. For example, the UE may receive, from the network entity, a random access response using at least one of the SCSs indicated at block 602, and the UE may transmit, to the network entity, a payload using at least one of the SCSs based on a scheduling grant indicated in the random access response. The UE may switch from a first bandwidth part (BWP) (e.g., a BWP in FR1 or FR2) at a first SCS (e.g., 30 kHz) to a second BWP (e.g., a BWP in the 52.6 GHz to 71 GHz frequency bands) at a second SCS (e.g., 480 kHz) provided by the indication, where the switch to the second BWP occurs after a gap in time from when the UE transmitted the indication. In certain cases, the UE may receive, from the network entity, a configuration to switch to a BWP using an SCS indicated at block 602. The UE may receive this configuration prior to sending the SCS capability and/or in response to sending the SCS capability. The UE may transmit, to the network entity, a payload via the BWP using at least one of the SCSs indicated at block 602 based on the configuration.

For certain aspects, the indication of the SCS capability and application of the SCS capability may use the same SCS for the channels and/or signals or use a different SCS per channel and/or signal. For example, the UE may indicate its SCS capability and communicate with the network in a RACH procedure at a 120 kHz SCS, and the UE may communicate with the network in the PUSCH and/or PDSCH at a 960 kHz SCS. At block 604, the UE may communicate with the network entity via one of the SCS for all types of channels or signals (e.g., PDSCH, PUSCH, PUCCH, and/or PDCCH and corresponding signals). In certain cases, the UE may communicate with the network entity via a first SCS (e.g., 120 kHz) for a first type of channel or signal (e.g., PUCCH and/or PDCCH) and a second SCS (e.g., 960 kHz) for a second type of channel or signal (e.g., PDSCH and/or PUSCH and corresponding signals). The second SCS may include at least one of SCS(s) indicated at block 602.

The various manners for indicating the SCS capability described herein may be applied separately or in various combinations. For example, the UE may indicate the SCS capability using dedicated RACH resources for the indicating the SCS capability as well as a specific preamble sequence that is associated with the SCS capability. In such cases, usage of the dedicated RACH resources may indicate to the network to inspect the preamble sequence for the SCS capability.

Figure 7:
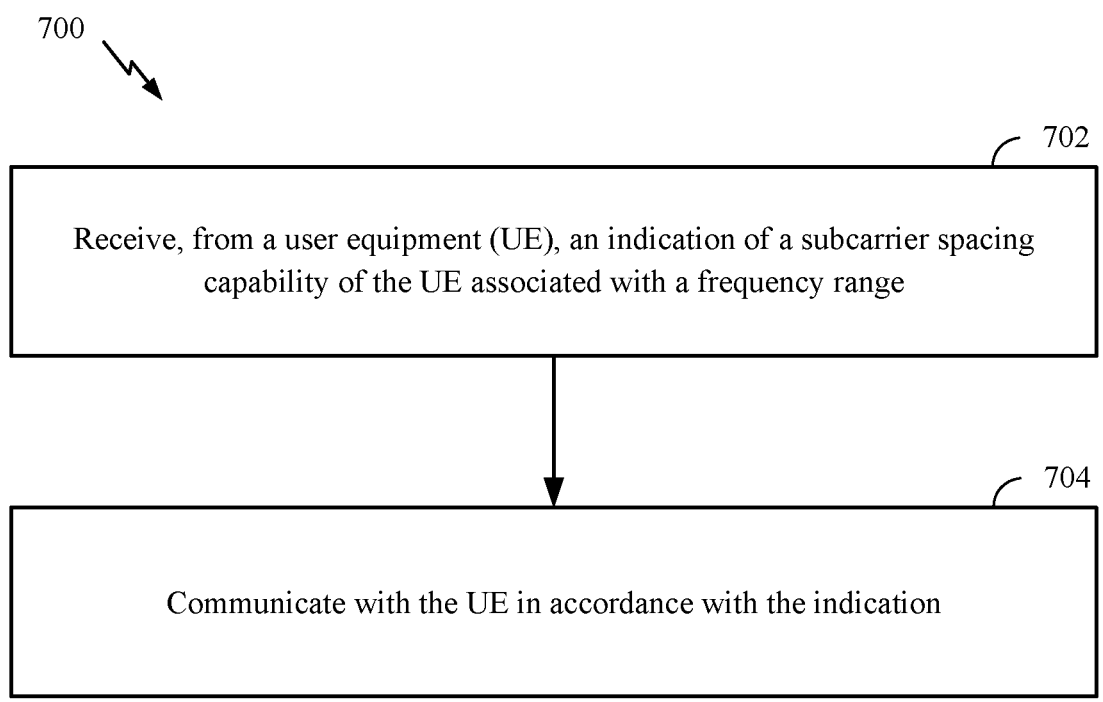
FIG. 7 is a flow diagram illustrating example operations for wireless communication by a network entity, in accordance with certain aspects of the present disclosure.

FIG. 7 is a flow diagram illustrating example operations 700 for wireless communication, in accordance with certain aspects of the present disclosure. The operations 700 may be performed, for example, by a network entity (such as the BS 110a in the wireless communication network 100). The operations 700 may be complementary to the operations 600 performed by the UE. The operations 700 may be implemented as software components that are executed and run on one or more processors (e.g., controller/processor 240 of FIG. 2). Further, the transmission and reception of signals by the network entity in operations 700 may be enabled, for example, by one or more antennas (e.g., antennas 234 of FIG. 2) and/or a transceiver (e.g., the transceiver 232). In certain aspects, the transmission and/or reception of signals by the network entity may be implemented via a bus interface of one or more processors (e.g., controller/processor 240) obtaining and/or outputting signals. As used herein, the network entity may refer to a wireless communication device in a radio access network, such as a base station, a remote radio head or antenna panel in communication with a base station, and/or network controller.

The operations 700 may begin, at block 702, where the network entity may receive, from a UE (e.g., the UE 120), an indication of a SCS capability of the UE associated with a frequency range. For example, the network entity may receive the indication without prompting the UE to provide the SCS capability. In certain cases, the network entity may receive the indication in a RACH procedure, a PUSCH transmission, and/or a PUCCH transmission.

At block 704, the UE may communicate with the UE in accordance with the indication. For example, the SCS capability may indicate that the UE supports the SCS of 480 kHz, and in response to the indication, the network entity may send a downlink transmission to the UE at the SCS of 480 kHz.

In certain aspects, the network entity may receive the indication of the SCS capability in various manners, for example, as described herein with respect to the operations 600. The indication at block 702 may be provided via at least one of a frequency domain resource or a time domain resource used to receive the indication. The indication at block 702 may be provided via the SCS used to receive the indication. The indication at block 702 may be provided via the parameter(s) (e.g., a root index, initialization value, and/or a cyclic shift) used to generate a sequence for a reference signal received from the UE.

For certain aspects, the network entity may receive the indication of the SCS capability in a RACH procedure (e.g., any of the RACH procedures depicted in FIG. 4, 5A, or 5B), for example, as described herein with respect to the operations 600. At block 602, the network entity may receive the indication via a RACH preamble sequence, where the indication may be provided explicitly or implicitly in the preamble. In certain cases, the indication may be provided via at least one of a root value or a cyclic shift used to generate the RACH preamble sequence. The indication may be provided via the frequency domain resource, the time domain resource, and/or the SCS used to receive the RACH preamble sequence.

In certain aspects, the payload (e.g., MSG3 and/or MSGA) received in the PUSCH in a RACH procedure may indicate the SCS capability explicitly or implicitly. The indication may be provided via at least one of an initialization value or a cyclic shift used to generate a sequence for the DMRS received with the payload. The indication may be provided by the frequency domain resource, the time domain resources, and/or the SCS used to receive the payload.

The various manners for indicating the SCS capability may be applied in the context of a two-step RACH procedure and/or a four-step RACH procedure, for example, as described herein with respect to the operations 600. For example, a combination of the aspects described herein for the preamble and/or payload may be applied to MSG1, MSG3, and/or MSGA for the corresponding RACH procedure.

The various manners for indicating the SCS capability via the payload on the PUSCH may be applied in the context of a PUCCH transmission and/or PUSCH transmission. For example, the network entity may receive the indication via a message following a RACH procedure. In certain cases, the indication may be received via MSG5, for example, as described herein with respect to FIG. 4. The network entity may transmit a contention resolution message (e.g., MSG4) to the UE in a RACH procedure, and the network entity may receive a feedback message (e.g., MSG5) in response to the contention resolution message, where the indication may be provided via the feedback message, for example, using any one or more of the various manners for indicating the SCS capability described herein with respect to the preamble and/or payload.

For certain aspects, the network may have separate SSB(s) using the optional SCS(s), and the network entity may communicate with UE(s) capable of acquiring the SSBs in RACH occasions associated with the SSB(s) using the optional SCS(s), for example, as described herein with respect to the operations 600. The network entity may transmit a synchronization signal (e.g., SSB) at an SCS (such as one or more of the optional SCSs), and the network entity may receive the indication via the SCS associated with the synchronization signal.

At block 704, the network entity may communicate with the UE via at least one of the SCS indicated at block 702. For example, the network entity may transmit, to the UE, a random access response using at least one of the SCSs indicated at block 702, and the network entity may receive, from the UE, a payload using at least one of the SCSs based on a scheduling grant indicated in the random access response.

To execute the SCS change at the UE, the network entity may also switch to a bandwidth part that supports the SCS and allow for a tuning gap in time to enable the UE to retune to the band using the SCS. The network entity may switch from a first BWP (e.g., a BWP in FR1 or FR2) at a first SCS (e.g., 60 kHz) to a second BWP (e.g., a BWP in the 52.6 GHz to 71 GHz frequency bands) at a second SCS (e.g., 960 kHz) provided by the indication, where switching to the second BWP occurs after a gap in time from when the network entity received the indication. In certain cases, the network entity may transmit, to the UE, a configuration to switch to a BWP using an SCS indicated at block 702. The network entity may send this configuration prior to receiving the SCS capability of the UE and/or in response to receiving the SCS capability of the UE. The network entity may receive, from the UE, a payload via the BWP using the SCS indicated at block based on the configuration.

For certain aspects, the indication of the SCS capability and application of the SCS capability may use the same SCS for the channels and/or signals or use a different SCS per channel and/or signal. For example, the network entity may communicate with the UE via an SCS indicated at block 702 for all types of channels or signals. The network entity may communicate with the UE via a first SCS (e.g., 120 kHz) for a first type of channel or signal and a second SCS (e.g., 480 kHz) for a second type of channel or signal, where the second SCS includes at least one of the SCSs indicated at block 702.

Figure 8A:
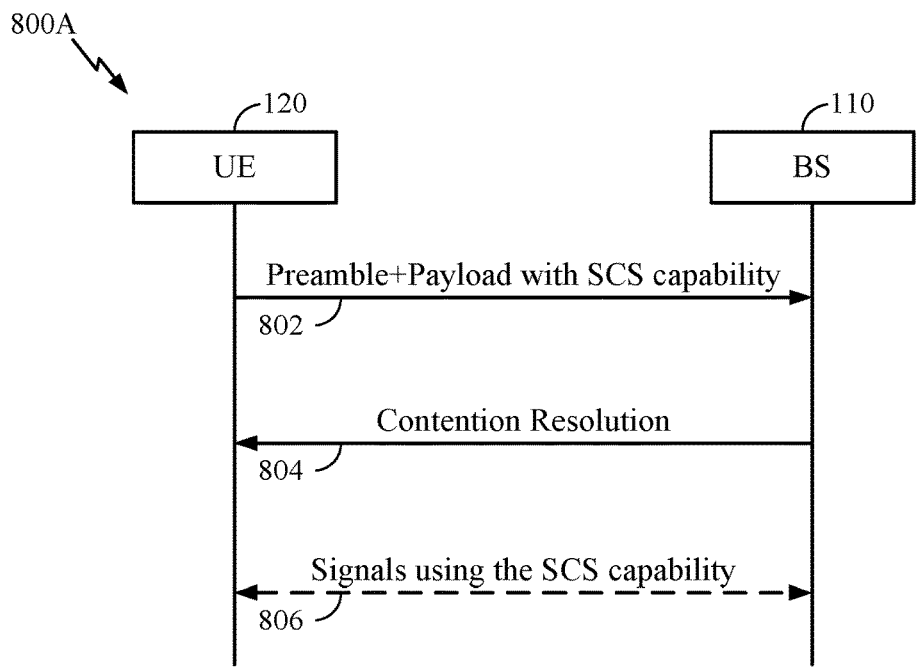
FIG. 8A is a signaling flow diagram illustrating example signaling for indicating a subcarrier spacing (SCS) capability and using the SCS capability after a two-step RACH procedure, in accordance with certain aspects of the present disclosure.

FIG. 8A is a signaling flow diagram illustrating example signaling 800A for indicating an SCS capability and using the SCS capability after a two-step RACH procedure, in accordance with certain aspects of the present disclosure. At 802, the UE 120 may transmit an indication of the SCS capability in a message including a RACH preamble and a payload. For example, the SCS capability may be provided by a specific preamble sequence used in the RACH preamble. In certain cases, the SCS capability may be provided by a specific sequence used for transmitting the DMRS with the payload on the PUSCH. The UE 120 may transmit the indication of the SCS capability using a different SCS from the SCS(s) indicated in the SCS capability. For example, the UE 120 may transmit the SCS capability using the SCS 120 kHz, and the SCS capability may indicate that the UE supports SCSs 480 kHz and/or 960 kHz. At 804, the UE 120 may receive, from the BS 110, a contention resolution message indicating that the BS 110 successfully decoded the payload. The UE 120 may receive the contention resolution message using different SCS (e.g., 120 kHz) from the SCS(s) (e.g., 480 kHz and/or 960 kHz) indicated in the SCS capability. At 806, the UE 120 may communicate with the BS 110 using at least one of the SCSs indicated in the SCS capability. For example, the UE 120 may receive downlink data from the BS 110 using the SCS 480 kHz. It will be appreciated that the unprompted indication of the SCS capability may enable the network to accommodate the UE's SCS capability. For example, at 806, the network entity may configure the UE 120 to communicate in the 52.6 GHz to 71 GHz frequency bands using the SCS 480 kHz and/or 960 kHz to facilitate desirable latencies and/or data rates.

Figure 8B:
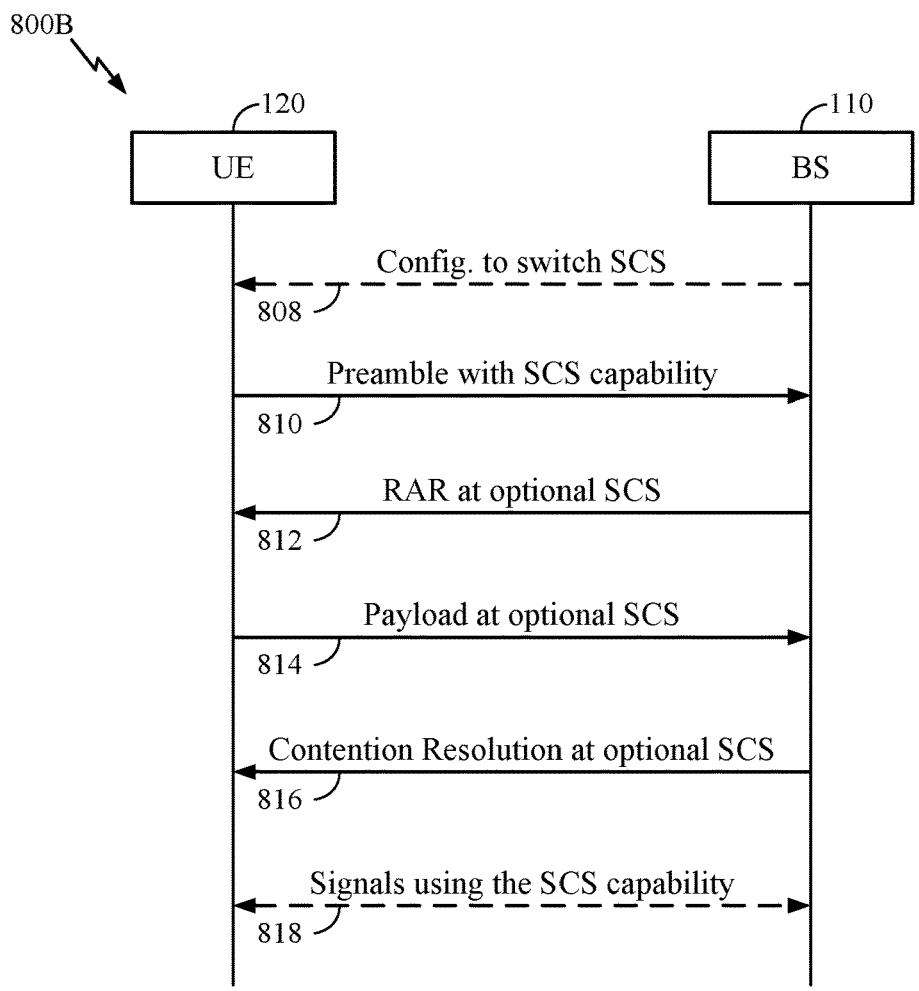
FIG. 8B is a signaling flow diagram illustrating example signaling for indicating an SCS capability and using the SCS capability during a four-step RACH procedure, in accordance with certain aspects of the present disclosure.

FIG. 8B is a signaling flow diagram illustrating example signaling 800B for indicating an SCS capability and using the SCS capability during a four-step RACH procedure, in accordance with certain aspects of the present disclosure. Optionally, at 808, the UE 120 may receive a configuration to switch to the optional SCSs if the UE 120 supports the optional SCS(s). At 810, the UE 120 may transmit a RACH preamble indicating the SCS capability of the UE. For example, the transmission of the RACH preamble may use resources associated with a specific SCS capability. The UE 120 may transmit the indication of the SCS capability using a different SCS from the SCS(s) indicated in the SCS capability. At 812, the UE 120 may receive a random access response using one of the SCSs indicated in the SCS capability. That is, the UE 120 may switch from one SCS to another SCS to receive the random access response at UE 120. In certain cases, the UE 120 may also switch to a band that supports the other SCS, and the UE 120 may take a tuning gap in time to execute the bandwidth part switch that supports the other SCS. The random access response may include a scheduling grant providing uplink resources for the payload. At 814, the UE 120 may transmit the payload according to the scheduling grant and using the SCS indicated in the SCS capability. At 816, the UE 120 may receive a contention resolution message using the SCS indicated in the SCS capability. At 818, the UE 120 may continue to communicate with the BS 110 using the SCS indicated in the SCS capability. It will be appreciated that the automatic switch to one of the SCSs indicated in the SCS capability may enable desirable latencies and/or data rates for the RACH procedure. For example, the UE 120 may switch from an SCS supported in FR1 bands to an SCS supported in mmWave bands, which facilitate desirable latencies and/or data rates.

While the examples depicted in FIGS. 8A and 8B are described herein with respect to indicating the SCS capability in two-step or four-step RACH procedures to facilitate understanding, aspects of the present disclosure may also be applied to indicating the SCS capability in a PUSCH transmission and/or PUCCH transmission.

Figure 9:
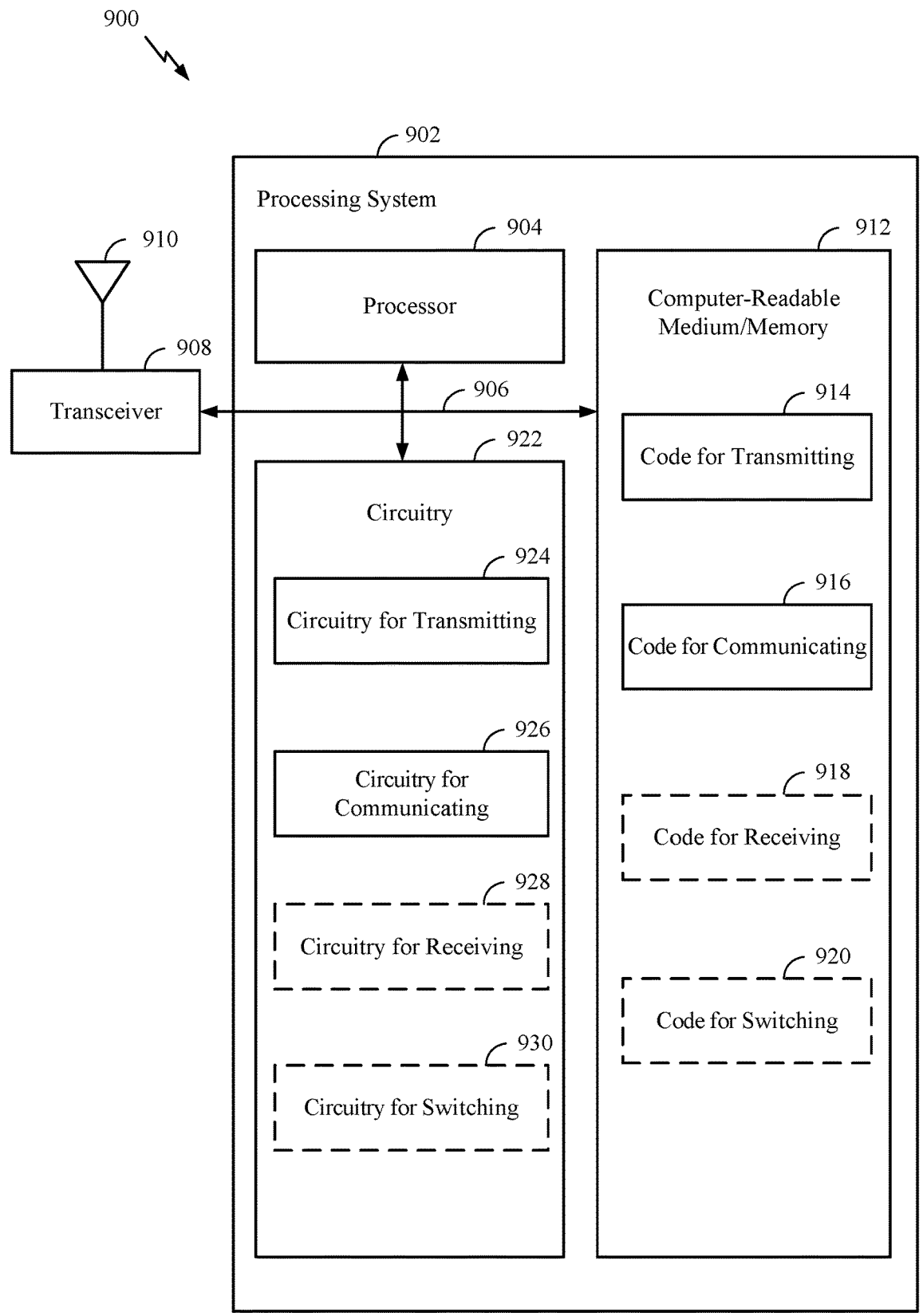
FIG. 9 illustrates a communications device (e.g., a UE) that may include various components configured to perform operations for the techniques disclosed herein in accordance with aspects of the present disclosure.

FIG. 9 illustrates a communications device 900 (e.g., a UE) that may include various components (e.g., corresponding to means-plus-function components) configured to perform operations for the techniques disclosed herein, such as the operations illustrated in FIG. 6. The communications device 900 includes a processing system 902 coupled to a transceiver 908 (e.g., a transmitter and/or a receiver). The transceiver 908 is configured to transmit and receive signals for the communications device 900 via an antenna 910, such as the various signals as described herein. The processing system 902 may be configured to perform processing functions for the communications device 900, including processing signals received and/or to be transmitted by the communications device 900.

The processing system 902 includes a processor 904 coupled to a computer-readable medium/memory 912 via a bus 906. In certain aspects, the computer-readable medium/memory 912 is configured to store instructions (e.g., computer-executable code) that when executed by the processor 904, cause the processor 904 to perform the operations illustrated in FIG. 6, or other operations for performing the various techniques discussed herein for indicating an SCS capability and communicating in accordance with such capability. In certain aspects, computer-readable medium/memory 912 stores code for transmitting 914, code for communicating 916, code for receiving 918, and/or code for switching 920. In certain aspects, the processing system 902 has circuitry 922 configured to implement the code stored in the computer-readable medium/memory 912. In certain aspects, the circuitry 922 is coupled to the processor 904 and/or the computer-readable medium/memory 912 via the bus 906. For example, the circuitry 922 includes circuitry for transmitting 924, circuitry for communicating 926, circuitry for receiving 928, and/or circuitry for switching 930.

Figure 10:
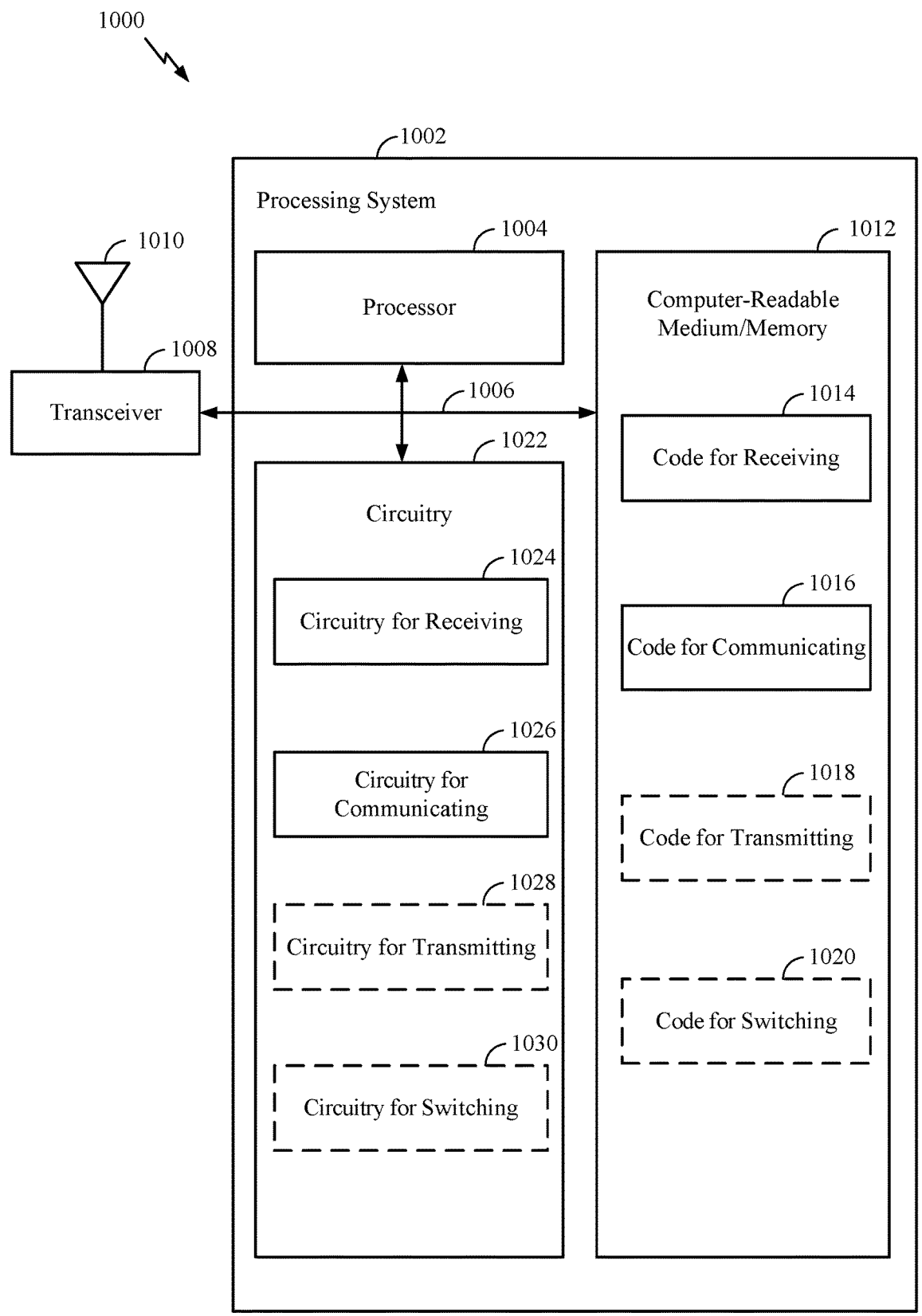
FIG. 10 illustrates a communications device (e.g., a BS) that may include various components configured to perform operations for the techniques disclosed herein in accordance with aspects of the present disclosure.

FIG. 10 illustrates a communications device 1000 (e.g., a base station) that may include various components (e.g., corresponding to means-plus-function components) configured to perform operations for the techniques disclosed herein, such as the operations illustrated in FIG. 7. The communications device 1000 includes a processing system 1002 coupled to a transceiver 1008 (e.g., a transmitter and/or a receiver). The transceiver 1008 is configured to transmit and receive signals for the communications device 1000 via an antenna 1010, such as the various signals as described herein. The processing system 1002 may be configured to perform processing functions for the communications device 1000, including processing signals received and/or to be transmitted by the communications device 1000.

The processing system 1002 includes a processor 1004 coupled to a computer-readable medium/memory 1012 via a bus 1006. In certain aspects, the computer-readable medium/memory 1012 is configured to store instructions (e.g., computer-executable code) that when executed by the processor 1004, cause the processor 1004 to perform the operations illustrated in FIG. 7, or other operations for performing the various techniques discussed herein for obtaining an indication of an SCS capability of a UE and communicating in accordance with such capability. In certain aspects, computer-readable medium/memory 1012 stores code for receiving 1014, code for communicating 1016, code for transmitting 1018, and/or code for switching 1020. In certain aspects, the processing system 1002 has circuitry 1022 configured to implement the code stored in the computer-readable medium/memory 1012. In certain aspects, the circuitry 1022 is coupled to the processor 1004 and/or the computer-readable medium/memory 1012 via the bus 1006. For example, the circuitry 1022 includes circuitry for receiving 1024, circuitry for communicating 1026, circuitry for transmitting 1028, and/or circuitry for switching 1030.

EXAMPLE ASPECTS

In addition to the various aspects described above, specific combinations of aspects are within the scope of the disclosure, some of which are detailed below:

Aspect 1. A method of wireless communication by a user equipment (UE), comprising: transmitting, to a network entity, an indication of a subcarrier spacing capability of the UE associated with a frequency range; and communicating with the network entity in accordance with the indication.

Aspect 2. The method of Aspect 1, wherein the frequency range includes 52.6 GHz to 71 GHz.

Aspect 3. The method according to any of Aspects 1 or 2, wherein the subcarrier spacing capability provides that the UE supports one or more subcarrier spacings including at least one of 480 kHz or 960 kHz.

Aspect 4. The method according to any of Aspects 1-3, wherein the indication is provided via at least one of a frequency domain resource or a time domain resource used to transmit the indication.

Aspect 5. The method according to any of Aspects 1-4, wherein the indication is provided via the one or more subcarrier spacings used to transmit the indication.

Aspect 6. The method according to any of Aspects 1-5, wherein transmitting the indication comprises transmitting the indication via a random access channel (RACH) preamble sequence.

Aspect 7. The method of Aspect 6, wherein the indication is provided via at least one of a root value or a cyclic shift used to generate the RACH preamble sequence.

Aspect 8. The method according to any of Aspects 6 or 7, wherein the indication is provided via at least one of a frequency domain resource or a time domain resource used to transmit the RACH preamble sequence.

Aspect 9. The method according to any of Aspects 6-8, wherein the indication is provided via the one or more subcarrier spacings used to transmit the RACH preamble sequence.

Aspect 10. The method according to any of Aspects 1-9, wherein transmitting the indication comprises transmitting the indication via a payload on a physical uplink shared channel (PUSCH) in a RACH procedure.

Aspect 11. The method of Aspect 10, wherein: the payload is transmitted with a demodulation reference signal (DMRS); and the indication is provided via at least one of an initialization value or a cyclic shift used to generate a sequence for the DMRS.

Aspect 12. The method according to any of Aspects 10 or 11, wherein the indication is provided via at least one of a frequency domain resource or a time domain resource used to transmit the payload.

Aspect 13. The method according to any of Aspects 10-12, wherein the indication is provided via the one or more subcarrier spacings used to transmit the payload.

Aspect 14. The method according to any of Aspects 1-13, wherein transmitting the indication comprises transmitting the indication via a message including a random access channel (RACH) preamble sequence on a physical random access channel (PRACH) and a payload on a physical uplink shared channel (PUSCH).

Aspect 15. The method of Aspect 14, wherein the indication is provided via at least one of a root value, an initialization value, or a cyclic shift used to generate at least one of the RACH preamble sequence or a sequence for a DMRS associated with the payload.

Aspect 16. The method according to any of Aspects 14 or 15, wherein the indication is provided via at least one of a frequency domain resource or a time domain resource used to transmit at least one of the RACH preamble sequence or the payload.

Aspect 17. The method according to any of Aspects 14-16, wherein the indication is provided via the one or more subcarrier spacings used to transmit at least one of the RACH preamble sequence or the payload.

Aspect 18. The method according to any of Aspects 1-17, wherein transmitting the indication comprises transmitting the indication via a message following a RACH procedure.

Aspect 19. The method according to any of Aspects 1-18, further comprising: receiving a contention resolution message from the network entity in a RACH procedure; wherein transmitting the indication comprises transmitting a feedback message in response to the contention resolution message; and wherein the indication is provided via the feedback message.

Aspect 20. The method according to any of Aspects 1-9, further comprising: receiving, from the network entity, a synchronization signal at the one or more subcarrier spacings; and wherein transmitting the indication comprises transmitting the indication via the one or more subcarrier spacings associated with the synchronization signal.

Aspect 21. The method according to any of Aspects 1-20, wherein communicating with the network entity comprises communicating with the network entity via at least one of the one or more subcarrier spacings.

Aspect 22. The method according to any of Aspects 1-21, wherein communicating with the network entity comprises: receiving, from the network entity, a random access response at the one or more subcarrier spacings; and transmitting, to the network entity, a payload at the one or more subcarrier spacings based on a scheduling grant indicated in the random access response.

Aspect 23. The method according to any of Aspects 1-22, wherein communicating with the network entity comprises switching from a first bandwidth part (BWP) at a first subcarrier spacing to a second BWP at a second subcarrier spacing provided by the indication, wherein switching to the second BWP occurs after a gap in time from when the UE transmitted the indication.

Aspect 24. The method according to any of Aspects 1-23, wherein communicating with the network entity comprises: receiving, from the network entity, a configuration to switch to a BWP at the one or more subcarrier spacings; and transmitting, to the network entity, a payload via the BWP at the one or more subcarrier spacings based on the configuration.

Aspect 25. The method according to any of Aspects 1-24, wherein communicating with the network entity comprises communicating with the network entity via one of the one or more subcarrier spacings for all types of channels or signals.

Aspect 26. The method according to any of Aspects 1-25, wherein communicating with the network entity comprises communicating with the network entity via a first subcarrier spacing for a first type of channel or signal and a second subcarrier spacing for a second type of channel or signal, wherein the second subcarrier spacing includes at least one of the one or more subcarrier spacings.

Aspect 27. A method of wireless communication by a network entity, comprising: receiving, from a user equipment (UE), an indication of a subcarrier spacing capability of the UE associated with a frequency range; and communicating with the UE in accordance with the indication.

Aspect 28. The method of Aspect 27, wherein the frequency range includes 52.6 GHz to 71 GHz.

Aspect 29. The method according to any of Aspects 27 or 28, wherein the subcarrier spacing capability provides that the UE supports one or more subcarrier spacings including at least one of 480 kHz or 960 kHz.

Aspect 30. The method according to any of Aspects 27-29, wherein the indication is provided via at least one of a frequency domain resource or a time domain resource used to receive the indication.

Aspect 31. The method according to any of Aspects 27-30, wherein the indication is provided via the one or more subcarrier spacings used to receive the indication.

Aspect 32. The method according to any of Aspects 27-31, wherein receiving the indication comprises receiving the indication via a random access channel (RACH) preamble sequence.

Aspect 33. The method of Aspect 32, wherein the indication is provided via at least one of a root value or a cyclic shift used to generate the RACH preamble sequence.

Aspect 34. The method according to any of Aspects 32 or 33, wherein the indication is provided via at least one of a frequency domain resource or a time domain resource used to receive the RACH preamble sequence.

Aspect 35. The method according to any of Aspects 32-34, wherein the indication is provided via the one or more subcarrier spacings used to receive the RACH preamble sequence.

Aspect 36. The method according to any of Aspects 27-35, wherein receive the indication comprises receiving the indication via a payload on a physical uplink shared channel (PUSCH) in a RACH procedure.

Aspect 37. The method of Aspect 36, wherein: the payload is received with a demodulation reference signal (DMRS); and the indication is provided via at least one of an initialization value or a cyclic shift used to generate a sequence for the DMRS.

Aspect 38. The method according to any of Aspects 36 or 37, wherein the indication is provided via at least one of a frequency domain resource or a time domain resource used to receive the payload.

Aspect 39. The method according to any of Aspects 36-38, wherein the indication is provided via the one or more subcarrier spacings used to receive the payload.

Aspect 40. The method according to any of Aspects 27-39, wherein receiving the indication comprises receiving the indication via a message including a random access channel (RACH) preamble sequence on a physical random access channel (PRACH) and a payload on a physical uplink shared channel (PUSCH).

Aspect 41. The method of Aspect 40, wherein the indication is provided via at least one of a root value, an initialization value, or a cyclic shift used to generate at least one of the RACH preamble sequence or a sequence for a DMRS associated with the payload.

Aspect 42. The method according to any of Aspects 40 or 41, wherein the indication is provided via at least one of a frequency domain resource or a time domain resource used to receive at least one of the RACH preamble sequence or the payload.

Aspect 43. The method according to any of Aspects 40-42, wherein the indication is provided via the one or more subcarrier spacings used to receive at least one of the RACH preamble sequence or the payload.

Aspect 44. The method according to any of Aspects 27-43, wherein receiving the indication comprises receiving the indication via a message following a RACH procedure.

Aspect 45. The method according to any of Aspects 27-44, further comprising: transmitting a contention resolution message to the UE in a RACH procedure; wherein receiving the indication comprises receiving a feedback message in response to the contention resolution message; and wherein the indication is provided via the feedback message.

Aspect 46. The method according to any of Aspects 27-45, further comprising: transmitting a synchronization signal at the one or more subcarrier spacings; and wherein receiving the indication comprises receiving the indication via the one or more subcarrier spacings associated with the synchronization signal.

Aspect 47. The method according to any of Aspects 27-46, wherein communicating with the UE comprises communicating with the UE via at least one of the one or more subcarrier spacings.

Aspect 48. The method according to any of Aspects 27-47, wherein communicating with the UE comprises: transmitting, to the UE, a random access response at the one or more subcarrier spacings; and receiving, from the UE, a payload at the one or more subcarrier spacings based on a scheduling grant indicated in the random access response.

Aspect 49. The method according to any of Aspects 27-48, wherein communicating with the UE comprises switching from a first bandwidth part (BWP) at a first subcarrier spacing to a second BWP at a second subcarrier spacing provided by the indication, wherein switching to the second BWP occurs after a gap in time from when the network entity received the indication.

Aspect 50. The method according to any of Aspects 27-49, wherein communicating with the UE comprises: transmitting, to the UE, a configuration to switch to a BWP at the one or more subcarrier spacings; receiving, from the UE, a payload via the BWP at the one or more subcarrier spacings based on the configuration.

Aspect 51. The method according to any of Aspects 27-50, wherein communicating with the UE comprises communicating with the UE via one of the one or more subcarrier spacings for all types of channels or signals.

Aspect 52. The method according to any of Aspects 27-50, wherein communicating with the UE comprises communicating with the UE via a first subcarrier spacing for a first type of channel or signal and a second subcarrier spacing for a second type of channel or signal, wherein the second subcarrier spacing includes at least one of the one or more subcarrier spacings.

Aspect 53: An apparatus, comprising: a transceiver configured to perform a method in accordance with any one of Aspects 1-52.

Aspect 54: An apparatus, comprising means for performing a method in accordance with any one of Aspects 1-52.

Aspect 55: A computer-readable medium comprising executable instructions that, when executed by one or more processors of an apparatus, cause the apparatus to perform a method in accordance with any one of Aspects 1-52.

Aspect 56: A computer program product embodied on a computer-readable storage medium comprising code for performing a method in accordance with any one of Aspects 1-52.

Aspect 57: A user equipment, comprising: a memory; a processor coupled to the memory, the processor and the memory being configured to: transmit, to a network entity, an indication of a subcarrier spacing capability of the user equipment associated with a frequency range; and communicate with the network entity in accordance with the indication.

Aspect 58: The user equipment of Aspect 57, wherein: the frequency range includes 52.6 GHz to 71 GHz; and the subcarrier spacing capability provides that the user equipment supports one or more subcarrier spacings including at least one of 480 kHz or 960 kHz.

Aspect 59: The user equipment according to any of Aspects 57 or 58, wherein the indication is provided via at least one of a frequency domain resource, a time domain resource, or a subcarrier spacing used to transmit the indication.

Aspect 60: The user equipment according to any of Aspects 57-59, wherein the processor and the memory are configured to transmit the indication in a random access channel (RACH) procedure.

Aspect 61: The user equipment according to any of Aspects 57-60, wherein the processor and the memory are configured to transmit the indication via a message following a RACH procedure.

Aspect 62: The user equipment according to any of Aspects 57-61, wherein the processor and the memory are configured to: receive a contention resolution message from the network entity in a RACH procedure, and transmit a feedback message in response to the contention resolution message, wherein the indication is provided via the feedback message.

Aspect 63: The user equipment according to any of Aspects 57-62, wherein the processor and the memory are configured to: receive, from the network entity, a synchronization signal at the one or more subcarrier spacings, and transmit the indication via the one or more subcarrier spacings associated with the synchronization signal.

Aspect 64: The user equipment according to any of Aspects 57-63, wherein the processor and the memory are configured to communicate with the network entity via at least one of the one or more subcarrier spacings.

Aspect 65: The user equipment according to any of Aspects 57-64, wherein the processor and the memory are configured to: receive, from the network entity, a random access response at the one or more subcarrier spacings; and transmit, to the network entity, a payload at the one or more subcarrier spacings based on a scheduling grant indicated in the random access response.

Aspect 66: The user equipment according to any of Aspects 57-65, wherein the processor and the memory are configured to switch from a first bandwidth part (BWP) at a first subcarrier spacing to a second BWP at a second subcarrier spacing provided by the indication, after a gap in time from when the user equipment transmitted the indication.

Aspect 67: The user equipment according to any of Aspects 57-66, wherein the processor and the memory are configured to: receive, from the network entity, a configuration to switch to a BWP at the one or more subcarrier spacings; and transmit, to the network entity, a payload via the BWP at the one or more subcarrier spacings based on the configuration.

Aspect 68: The user equipment according to any of Aspects 57-67, wherein the processor and the memory are configured to communicate with the network entity via one of the one or more subcarrier spacings for all types of channels or signals.

Aspect 69: The user equipment according to any of Aspects 57-67, wherein the processor and the memory are configured to communicate with the network entity via a first subcarrier spacing for a first type of channel or signal and a second subcarrier spacing for a second type of channel or signal, wherein the second subcarrier spacing includes at least one of the one or more subcarrier spacings.

Aspect 70: A network entity, comprising: a memory; and a processor coupled to the memory, the processor and the memory being configured to: receive, from a user equipment (UE), an indication of a subcarrier spacing capability of the UE associated with a frequency range; and communicate with the UE in accordance with the indication.

Aspect 71: The network entity of Aspect 70, wherein: the frequency range includes 52.6 GHz to 71 GHz; and the subcarrier spacing capability provides that the UE supports one or more subcarrier spacings including at least one of 480 kHz or 960 kHz.

Aspect 72: The network entity according to any of Aspects 70 or 71, wherein the indication is provided via at least one of a frequency domain resource, a time domain resource, or a subcarrier spacing used to receive the indication.

Aspect 73: The network entity according to any of Aspects 70-72, wherein the processor and the memory are configured to receive the indication in a random access channel (RACH) procedure.

Aspect 74: The network entity according to any of Aspects 70-73, wherein the processor and the memory are configured to receive the indication via a message following a RACH procedure.

Aspect 75: The network entity according to any of Aspects 70-74, wherein the processor and the memory are configured to: transmit a contention resolution message to the UE in a RACH procedure; and receive a feedback message in response to the contention resolution message, wherein the indication is provided via the feedback message.

Aspect 76: The network entity according to any of Aspects 70-75, wherein the processor and the memory are configured to: transmit a synchronization signal at the one or more subcarrier spacings; and receive the indication via the one or more subcarrier spacings associated with the synchronization signal.

Aspect 77: The network entity according to any of Aspects 70-76, wherein the processor and the memory are configured to communicate with the UE via at least one of the one or more subcarrier spacings.

Aspect 78: The network entity according to any of Aspects 70-77, wherein the processor and the memory are configured to: transmit, to the UE, a random access response at the one or more subcarrier spacings; and receive, from the UE, a payload at the one or more subcarrier spacings based on a scheduling grant indicated in the random access response.

Aspect 79: The network entity according to any of Aspects 70-78, wherein the processor and the memory are configured to switch from a first bandwidth part (BWP) at a first subcarrier spacing to a second BWP at a second subcarrier spacing provided by the indication, after a gap in time from when the network entity received the indication.

Aspect 80: The network entity according to any of Aspects 70-79, wherein the processor and the memory are configured to: transmit, to the UE, a configuration to switch to a BWP at the one or more subcarrier spacings; and receive, from the UE, a payload via the BWP at the one or more subcarrier spacings based on the configuration.

Aspect 81: The network entity according to any of Aspects 70-80, wherein the processor and the memory are configured to communicate with the UE via one of the one or more subcarrier spacings for all types of channels or signals.

Aspect 82: The network entity according to any of Aspects 70-80, wherein the processor and the memory are configured to communicate with the UE via a first subcarrier spacing for a first type of channel or signal and a second subcarrier spacing for a second type of channel or signal, wherein the second subcarrier spacing includes at least one of the one or more subcarrier spacings.

The techniques described herein may be used for various wireless communication technologies, such as NR (e.g., 5G NR), 3GPP Long Term Evolution (LTE), LTE-Advanced (LTE-A), code division multiple access (CDMA), time division multiple access (TDMA), frequency division multiple access (FDMA), orthogonal frequency division multiple access (OFDMA), single-carrier frequency division multiple access (SC-FDMA), time division synchronous code division multiple access (TD-SCDMA), and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). LTE and LTE-A are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). NR is an emerging wireless communications technology under development.

In 3GPP, the term "cell" can refer to a coverage area of a Node B (NB) and/or a NB subsystem serving this coverage area, depending on the context in which the term is used. In NR systems, the term "cell" and BS, next generation NodeB (gNB or gNodeB), access point (AP), distributed unit (DU), carrier, or transmission reception point (TRP) may be used interchangeably. A BS may provide communication coverage for a macro cell, a pico cell, a femto cell, and/or other types of cells. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having an association with the femto cell (e.g., UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS.

A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet computer, a camera, a gaming device, a netbook, a smartbook, an ultrabook, an appliance, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, which may be narrowband IoT (NB-IoT) devices.

In some examples, access to the air interface may be scheduled. A scheduling entity (e.g., a BS) allocates resources for communication among some or all devices and equipment within its service area or cell. The scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. In some examples, a UE may function as a scheduling entity and may schedule resources for one or more subordinate entities (e.g., one or more other UEs), and the other UEs may utilize the resources scheduled by the UE for wireless communication. In some examples, a UE may function as a scheduling entity in a peer-to-peer (P2P) network, and/or in a mesh network. In a mesh network example, UEs may communicate directly with one another in addition to communicating with a scheduling entity.

The methods disclosed herein comprise one or more steps or actions for achieving the methods. The method steps and/or actions may be interchanged with one another. In other words, unless a specific order of steps or actions is specified, the order and/or use of specific steps and/or actions may be modified.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, a digital signal processor (DSP), an application specific integrated circuit (ASIC), or a processor (e.g., a general purpose or specifically programmed processor). Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a DSP, an ASIC, a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above can also be considered as examples of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein, for example, instructions for performing the operations described herein and illustrated in FIG. 6 and/or FIG. 7.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above.

The invention claimed is:

1. A user equipment, comprising:
a memory; and
a processor coupled to the memory, the processor and the memory being configured to:
receive a contention resolution message from a network entity in a random access channel (RACH) procedure;
transmit, to the network entity, a feedback message in response to the contention resolution message having an indication of a subcarrier spacing capability of the user equipment associated with a frequency range, wherein the indication comprises an indication of the user equipment's support for one or more optional subcarrier spacings; and
communicate with the network entity in accordance with the indication.

2. The user equipment of claim 1, wherein:
the frequency range includes 52.6 GHz to 71 GHz; and
the subcarrier spacing capability provides that the user equipment supports one or more subcarrier spacings including at least one of 480 kHz or 960 kHz.

3. The user equipment of claim 1, wherein the indication is provided via at least one of a frequency domain resource, a time domain resource, or a subcarrier spacing used to transmit the indication.

4. The user equipment of claim 1, wherein the processor and the memory are configured to:
receive, from the network entity, a synchronization signal at the one or more subcarrier spacings, and
transmit the indication via the one or more subcarrier spacings associated with the synchronization signal.

5. The user equipment of claim 1, wherein the processor and the memory are configured to communicate with the network entity via at least one of the one or more subcarrier spacings.

6. The user equipment of claim 1, wherein the processor and the memory are configured to:
receive, from the network entity, a random access response at the one or more subcarrier spacings; and
transmit, to the network entity, a payload at the one or more subcarrier spacings based on a scheduling grant indicated in the random access response.

7. The user equipment of claim 1, wherein the processor and the memory are configured to switch from a first bandwidth part (BWP) at a first subcarrier spacing to a second BWP at a second subcarrier spacing provided by the indication, after a gap in time from when the user equipment transmitted the indication.

8. The user equipment of claim 1, wherein the processor and the memory are configured to:
receive, from the network entity, a configuration to switch to a BWP at the one or more subcarrier spacings; and
transmit, to the network entity, a payload via the BWP at the one or more subcarrier spacings based on the configuration.

9. The user equipment of claim 1, wherein the processor and the memory are configured to communicate with the network entity via one of the one or more subcarrier spacings for all types of channels or signals.

10. The user equipment of claim 1, wherein the processor and the memory are configured to communicate with the network entity via a first subcarrier spacing for a first type of channel or signal and a second subcarrier spacing for a second type of channel or signal, wherein the second subcarrier spacing includes at least one of the one or more subcarrier spacings.

11. A network entity, comprising:
a memory; and
a processor coupled to the memory, the processor and the memory being configured to:
transmit a contention resolution message to a user equipment (UE) in a random access channel (RACH) procedure;
receive, from the UE, a feedback message in response to the contention resolution message having an indication of a subcarrier spacing capability of the UE associated with a frequency, wherein the indication comprises an indication of the UE's support for one or more optional subcarrier spacings; and
communicate with the UE in accordance with the indication.

12. The network entity of claim 11, wherein:
the frequency range includes 52.6 GHz to 71 GHz; and
the subcarrier spacing capability provides that the UE supports one or more subcarrier spacings including at least one of 480 kHz or 960 kHz.

13. The network entity of claim 11, wherein the indication is provided via at least one of a frequency domain resource, a time domain resource, or a subcarrier spacing used to receive the indication.

14. The network entity of claim 11, wherein the processor and the memory are configured to:
transmit a synchronization signal at the one or more subcarrier spacings; and
receive the indication via the one or more subcarrier spacings associated with the synchronization signal.

15. The network entity of claim 11, wherein the processor and the memory are configured to communicate with the UE via at least one of the one or more subcarrier spacings.

16. The network entity of claim 11, wherein the processor and the memory are configured to:
transmit, to the UE, a random access response at the one or more subcarrier spacings; and
receive, from the UE, a payload at the one or more subcarrier spacings based on a scheduling grant indicated in the random access response.

17. The network entity of claim 11, wherein the processor and the memory are configured to switch from a first bandwidth part (BWP) at a first subcarrier spacing to a second BWP at a second subcarrier spacing provided by the indication, after a gap in time from when the network entity received the indication.

18. The network entity of claim 11, wherein the processor and the memory are configured to:
transmit, to the UE, a configuration to switch to a BWP at the one or more subcarrier spacings; and
receive, from the UE, a payload via the BWP at the one or more subcarrier spacings based on the configuration.

19. The network entity of claim 11, wherein the processor and the memory are configured to communicate with the UE via one of the one or more subcarrier spacings for all types of channels or signals.

20. The network entity of claim 11, wherein the processor and the memory are configured to communicate with the UE via a first subcarrier spacing for a first type of channel or signal and a second subcarrier spacing for a second type of channel or signal, wherein the second subcarrier spacing includes at least one of the one or more subcarrier spacings.

21. A method of wireless communication by a user equipment (UE), comprising:
receiving a contention resolution message from a network entity in a random access channel (RACH) procedure;

transmitting, to the network entity, a feedback message in response to the contention resolution message having an indication of a subcarrier spacing capability of the UE associated with a frequency range, wherein the indication comprises an indication of the UE's support for one or more optional subcarrier spacings; and communicating with the network entity in accordance with the indication.

22. The method of claim 21, wherein:

the frequency range includes 52.6 GHz to 71 GHz; and the subcarrier spacing capability provides that the UE supports one or more subcarrier spacings including at least one of 480 kHz or 960 kHz.

23. A method of wireless communication by a network entity, comprising:

transmitting a contention resolution message to a user equipment (UE) in a random access channel (RACH) procedure;

receiving, from the UE, a feedback message in response to the contention resolution message having an indication of a subcarrier spacing capability of the UE associated with a frequency range, wherein the indication comprises an indication of the UE's support for one or more optional subcarrier spacings; and communicating with the UE in accordance with the indication.

24. The method of claim 23, wherein:

the frequency range includes 52.6 GHz to 71 GHz; and the subcarrier spacing capability provides that the UE supports one or more subcarrier spacings including at least one of 480 kHz or 960 kHz.

* * * * *